US012365142B2

(12) United States Patent
Morimatsu et al.

(10) Patent No.: US 12,365,142 B2
(45) Date of Patent: Jul. 22, 2025

(54) ADDITIVE MANUFACTURING SYSTEM

(71) Applicant: Shibaura Machine Co., Ltd., Chiyoda-ku (JP)

(72) Inventors: Daisuke Morimatsu, Numazu (JP); Shimpei Fujimaki, Mishima (JP)

(73) Assignee: Shibaura Machine Co., Ltd., Chiyoda-ku (JP)

( * ) Notice: Subject to any disclaimer, the term of this patent is extended or adjusted under 35 U.S.C. 154(b) by 495 days.

(21) Appl. No.: 17/641,271

(22) PCT Filed: Sep. 2, 2020

(86) PCT No.: PCT/JP2020/033344
§ 371 (c)(1),
(2) Date: Mar. 8, 2022

(87) PCT Pub. No.: WO2021/054127
PCT Pub. Date: Mar. 25, 2021

(65) Prior Publication Data
US 2022/0324175 A1    Oct. 13, 2022

(30) Foreign Application Priority Data
Sep. 20, 2019 (JP) .................. 2019-172151

(51) Int. Cl.
*B29C 67/00* (2017.01)
*B29C 64/209* (2017.01)
(Continued)

(52) U.S. Cl.
CPC .......... *B29C 64/393* (2017.08); *B29C 64/209* (2017.08); *B29C 64/268* (2017.08);
(Continued)

(58) Field of Classification Search
CPC ... B29C 64/209; B29C 64/268; B29C 64/393; B33Y 10/00; B33Y 30/00; B33Y 50/00; B33Y 50/02
See application file for complete search history.

(56) References Cited

U.S. PATENT DOCUMENTS

| 10,234,848 B2 | 3/2019 | Mehr et al. |
| 2017/0266727 A1 | 9/2017 | Nishino et al. |

(Continued)

FOREIGN PATENT DOCUMENTS

| CN | 109855578 A | 6/2019 |
| JP | 8-167584 A | 6/1996 |

(Continued)

OTHER PUBLICATIONS

International Search Report issued Nov. 10, 2020 in PCT/JP2020/033344 filed Sep. 2, 2020, 2 pages.

(Continued)

*Primary Examiner* — Ryan M Ochylski
(74) *Attorney, Agent, or Firm* — Oblon, McClelland, Maier & Neustadt, L.L.P.

(57) ABSTRACT

An additive manufacturing system includes an additive manufacturing unit configured to shape an object including a plurality of layers, a measurement unit configured to measure a state of each of the plurality of layers, and a control unit. The control unit includes a storage unit configured to store reference information based on internal defect information indicating a defect existing inside a sample object shaped by the additive manufacturing unit and including the plurality of layers, based on an electromagnetic wave which has passed through the sample object, and sample measurement information indicating a measurement result of the plurality of layers of the sample object measured by the measurement unit, and an estimation unit configured to estimate whether a defect occurs inside the (Continued)

object, based on measurement information indicating a measurement result of the plurality of layers of the object measured by the measurement unit and the reference information.

11 Claims, 17 Drawing Sheets

(51) Int. Cl.
  *B29C 64/268* (2017.01)
  *B29C 64/393* (2017.01)
  *B33Y 10/00* (2015.01)
  *B33Y 30/00* (2015.01)
  *B33Y 50/02* (2015.01)
(52) U.S. Cl.
  CPC .............. *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2017/0348900 A1 | 12/2017 | Williams et al. | |
| 2019/0147127 A1 | 5/2019 | Su et al. | |
| 2020/0198012 A1 | 6/2020 | Nishino et al. | |
| 2020/0223146 A1* | 7/2020 | Totzeck | B29C 64/188 |
| 2021/0001402 A1* | 1/2021 | Matthews | B22F 12/41 |
| 2021/0101332 A1 | 4/2021 | Kawanaka et al. | |
| 2021/0162505 A1* | 6/2021 | Narita | B22F 10/368 |

FOREIGN PATENT DOCUMENTS

| | | | |
|---|---|---|---|
| JP | 2005-335203 A | 12/2005 | |
| JP | 2009-4114 A | 1/2009 | |
| JP | 2010-117254 A | 5/2010 | |
| JP | 2016-60063 A | 4/2016 | |
| JP | 2018-20309 A | 2/2018 | |
| JP | 2018-47606 A | 3/2018 | |
| JP | 2018-158457 A | 10/2018 | |
| JP | 2019-142184 A | 8/2019 | |
| KR | 10-2018-0129057 A | 12/2018 | |
| WO | WO 2018/216845 A1 | 11/2018 | |
| WO | WO-2019030839 A1 * | 2/2019 | ............. B22F 10/28 |

OTHER PUBLICATIONS

Combined Chinese Office Action and Search Report issued Nov. 29, 2023, in corresponding Chinese Patent Application No. 202080067538.8 (with English Translation and English Translation of Category of Cited Documents), 16 pages.

Office Action issued Jan. 18, 2024, in corresponding German Patent Application No. 11 2020 004 392.4 (with English Translation), 13 pages.

"Intrusion detection", Xidian University Press, Aug. 31, 2009, with an English translation of pp. 134-135, 17 pages.

Combined Chinese Office Action and Search Report issued May 25, 2023, in corresponding Chinese Patent Application No. 202080067538.8 (with English Translation and English Translation of Category of Cited Documents), 13 pages.

"Probabilistic Statistical Model and Optimization", with Partial English translation, Paragraph 5.4.2 KNN algorithm, Hebei Science & Technology Press, vol. 1, Jun. 30, 2015, pp. 115-127.

Li Yong, "GPR Simulation and Defects Identification for Typical Lining Defects Models of Tunnel", with English translation Hunan Communication Science and Technology, Highway and Waterway Transportation, vol. 44, No. 3, Sep. 25, 2018, pp. 161-163.

\* cited by examiner

ADDITIVE MANUFACTURING SYSTEM

CROSS-REFERENCE TO RELATED APPLICATIONS

This application is a national stage application of International Application No. PCT/JP2020/033344, filed Sep. 2, 2020, which designates the United States, incorporated herein by reference, and which claims the benefit of priority from Japanese Patent Application No. 2019-172151, filed Sep. 20, 2019, the entire contents of which are incorporated herein by reference.

TECHNICAL FIELD

Embodiments of the present invention relate to an additive manufacturing system.

BACKGROUND ART

An additive manufacturing apparatus that forms layers with a material and shapes an object with a plurality of layers is known. There is a possibility that a defect may occur inside the object shaped by the additive manufacturing. Thus, the inside of the manufactured object is inspected through X-ray CT scanning or other methods.

CITATION LIST

Patent Literature

Patent Document 1: JP 2016-060063 A

SUMMARY OF INVENTION

Problem to be Solved by the Invention

The internal inspection of the object described above detects a defect which has already occurred inside the object after layers or the entire object have been formed. In other words, in the internal inspection, occurrence of a defect inside the object cannot be predicted, and occurrence of a defect cannot be prevented in advance.

Means for Solving Problem

An additive manufacturing system according to an embodiment includes an additive manufacturing unit, a measurement unit, and a control unit. The additive manufacturing unit is configured to shape an object including a plurality of layers by forming the plurality of layers. The measurement unit is configured to measure a state of each of the layers. The control unit includes a storage unit and an estimation unit. The storage unit is configured to store reference information based on internal defect information indicating a defect existing inside a sample object which is shaped by the additive manufacturing unit and which includes the plurality of layers, based on an electromagnetic wave which has passed through the sample object, and sample measurement information indicating a measurement result of the plurality of layers of the sample object measured by the measurement unit. The estimation unit is configured to estimate whether or not a defect occurs inside the object, based on measurement information indicating a measurement result of the plurality of layers of the object measured by the measurement unit and the reference information.

DESCRIPTION OF EMBODIMENTS

First Embodiment

A first embodiment will be described below with reference to FIG. 1 to FIG. 7. Note that in the present specification, basically, a vertically upward direction is defined as an upward direction, and a vertically downward direction is defined as a downward direction. In addition, in the present specification, components according to embodiments and description of the components may be described in a plurality of expressions. The components and the description thereof are examples and are not limited by the expressions in the present specification. The components can be identified with names different from those in the present specification. In addition, the components can be described with expressions different from the expressions in the present specification.

Figure 1:
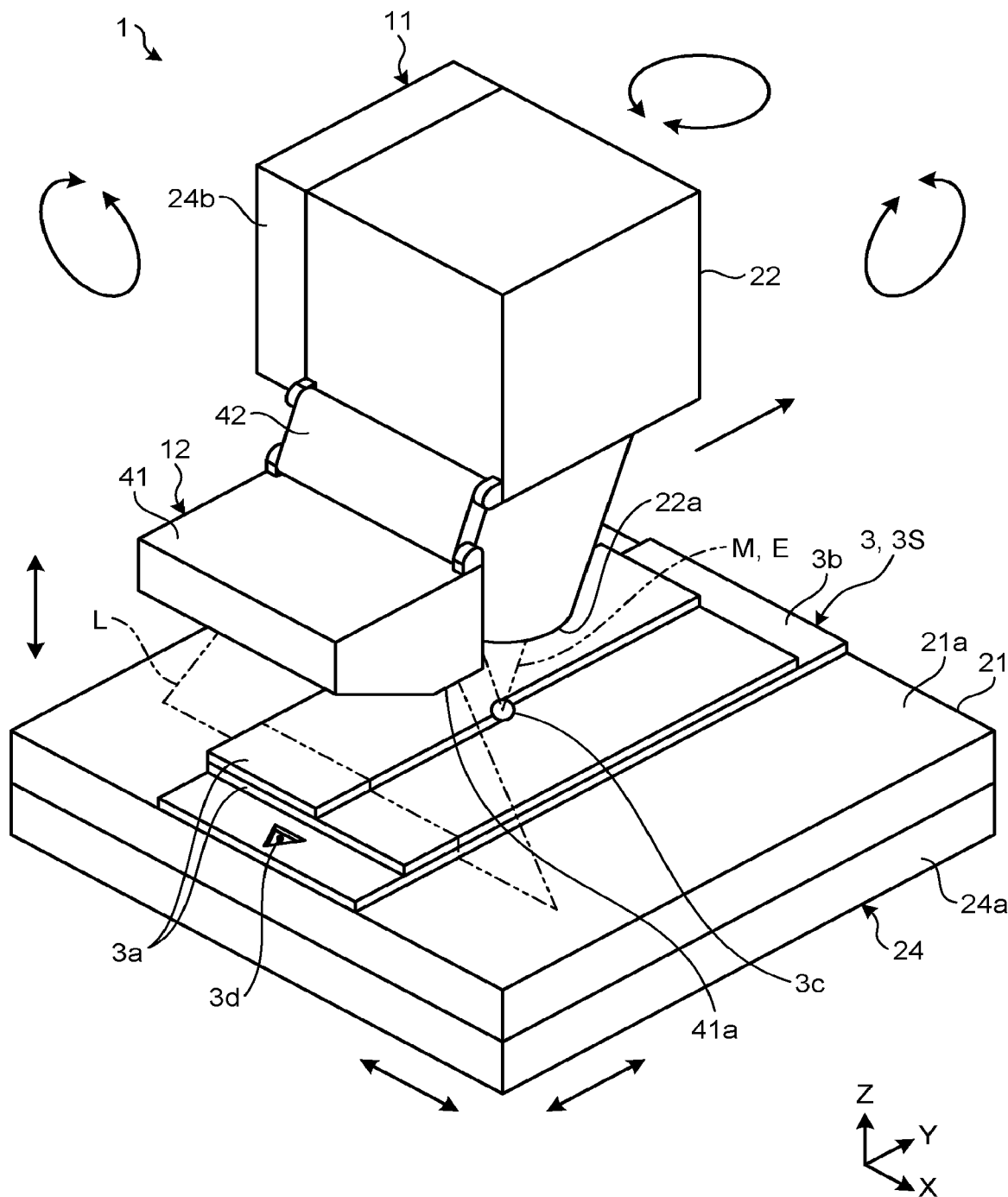
FIG. 1 is an exemplary perspective view schematically illustrating an additive manufacturing system according to a first embodiment.
Figure 2:
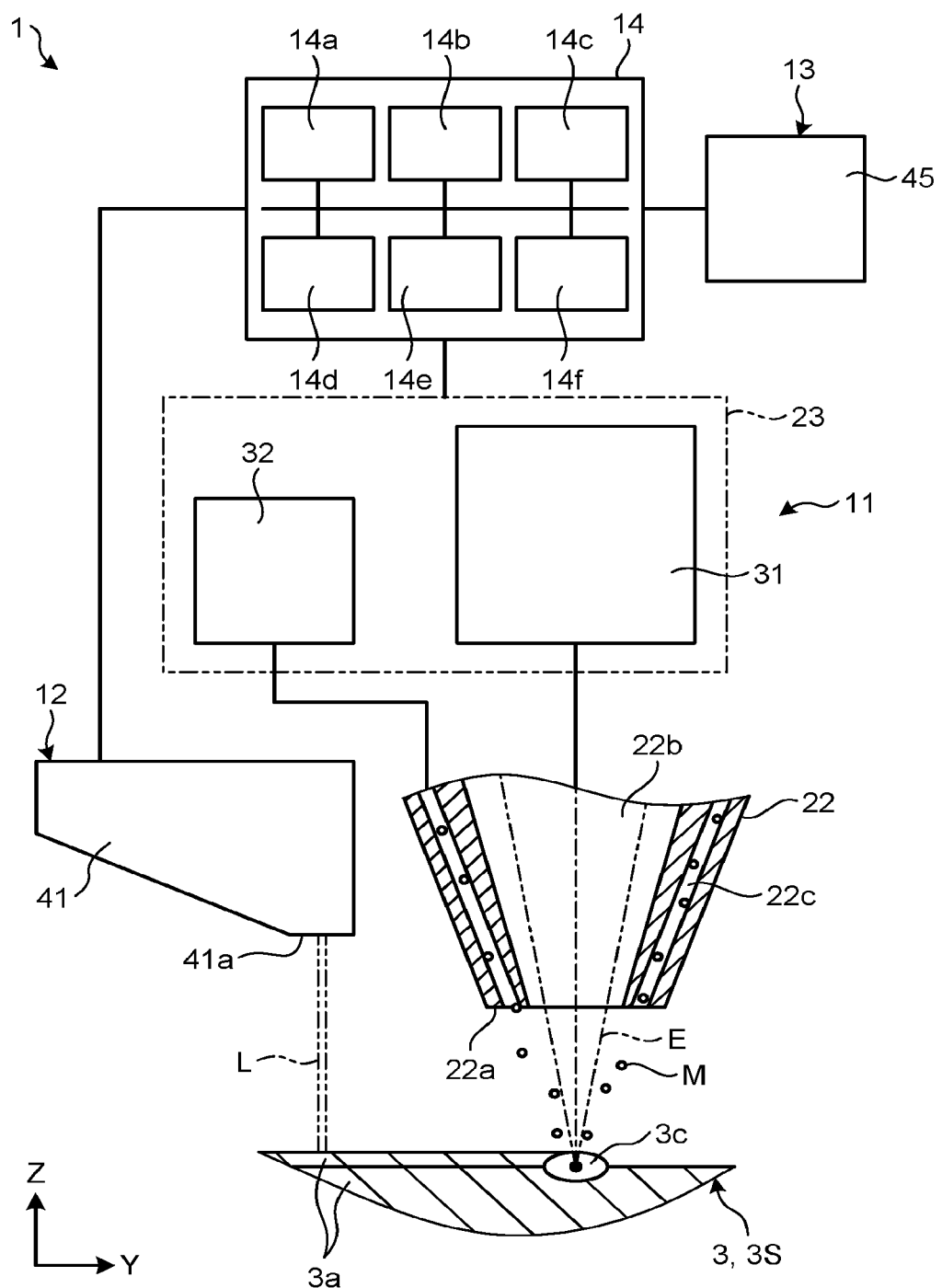
FIG. 2 is an exemplary cross-sectional view schematically illustrating the additive manufacturing system according to the first embodiment.

FIG. 1 is an exemplary perspective view schematically illustrating an additive manufacturing system 1 according to the first embodiment. FIG. 2 is an exemplary cross-sectional view schematically illustrating the additive manufacturing system 1 of the first embodiment. The additive manufacturing system 1 is a system including a three-dimensional printer of the so-called directed energy deposition (DED) scheme or laser metal deposition (LMD) scheme. The additive manufacturing system 1 is not limited to this example and may include other three-dimensional printers such as a three-dimensional printer of a powder bed fusion (PBF) scheme.

As illustrated in the drawings, an X axis, a Y axis, and a Z axis are defined in the present specification. The X axis, the Y axis, and the Z axis are orthogonal to each other. The Z axis extends, for example, in a vertical direction. The X axis and the Y axis extend, for example, in a horizontal direction. The additive manufacturing system 1 may be disposed such that the Z axis obliquely intersects the vertical direction.

Furthermore, in the present specification, an X direction, a Y direction, and a Z direction are defined. The X direction is a direction along the X axis and includes a +X direction indicated by an arrow of the X axis and a −X direction which is an opposite direction of the arrow of the X axis. The Y direction is a direction along the Y axis and includes a +Y direction indicated by an arrow of the Y axis and a −Y direction which is an opposite direction of the arrow of the Y axis. The Z direction is a direction along the Z axis and includes a +Z direction (upward direction) indicated by an arrow of the Z axis and a −Z direction (downward direction) which is an opposite direction of the arrow of the Z axis.

As illustrated in FIG. 2, the additive manufacturing system 1 includes a shaping unit 11, a measurement unit 12, an inspection unit 13, and a control unit 14. The shaping unit 11 is an example of an additive manufacturing unit. The control unit 14 can also be referred to as an information processing apparatus or a computer.

The shaping unit 11, for example, forms a plurality of solidified and stacked layers 3a with a powdered material M to additively manufacture (additively fabricate) a shaped object 3 having a predetermined shape including the plurality of layers 3a. The shaped object 3 is an example of an object. Note that the shaping unit 11 is not limited to this example, and the plurality of layers 3a may be formed with a wire-like material M.

As illustrated in FIG. 1 and FIG. 2, the shaping unit 11 includes a table 21, a head 22, a supply device 23, and a moving device 24. The table 21 is an example of an object support unit. The moving device 24 is an example of a moving unit.

As illustrated in FIG. 1, the table 21 has a support surface 21a. The support surface 21a is formed to be substantially flat and faces the +Z direction. Note that the support surface 21a may face other directions. The support surface 21a supports the shaped object 3 which has been additively manufactured, a product in process of the shaped object 3 including the layers 3a, and a base 3b on which the material M is to be stacked. In the following description, the shaped object 3 includes a shaped object 3 which has been additively manufactured, the product in process of the shaped object 3, and the base 3b.

The head 22 supplies the material M and stacks the material M on the support surface 21a or the base 3b supported by the support surface 21a. The material M is, for example, a powdered metal. The material M is not limited thereto and may be other materials such as a synthetic resin and ceramics. The additive manufacturing system 1 may additively manufacture the shaped object 3 using a plurality of types of materials M.

The head 22 discharges (injects) the material M onto the support surface 21a of the table 21 or the shaped object 3 on the support surface 21a. The head 22 may feed (inject) the wire-like material M. Furthermore, the discharged material M and the shaped object 3 on the support surface 21a are irradiated with an energy ray E from the head 22. The energy ray E is, for example, a laser beam.

A laser beam as the energy ray E is radiated from the head 22 in parallel with supply of the material M. Other energy rays E may be radiated from the head 22 as well as the laser beam. The energy ray E may be any ray as long as the material M can be melted or sintered like a laser beam, and may be, for example, an electron beam or an electromagnetic wave in a microwave or ultraviolet range.

The shaping unit 11 heats the base 3b and the discharged material M with the energy ray E to form a molten region (bead) 3c. The molten region 3c can also be referred to as a molten pool. The molten region 3c is an example of a molten material.

The material M is irradiated with the energy ray E from the head 22 in the molten region 3c, and melted or sintered, thereby being aggregated. Thus, the molten region 3c can include not only the supplied material M but also part of the shaped object 3 such as the base 3b irradiated with the energy ray E. In addition, the molten region 3c may be formed by bonding not only the completely molten material M but also the partially molten material M.

As a result of the molten region 3c being solidified, the layers 3a as an aggregate of the layered or thin-film material M are formed on the base or the shaped object 3. Note that the material M may be stacked in a granular form by being cooled by heat transfer to the aggregate of the material M, so as to form a granular aggregate (layers).

The shaping unit 11 may perform annealing treatment by irradiating the aggregate of the material M with the energy ray E from the head 22. The layers 3a are remelted or resintered by the energy ray E and then solidified again.

The shaping unit 11 additively manufactures the shaped object 3 by repeatedly stacking the layers 3a. In this manner, the head 22 of the shaping unit 11 radiates the energy ray E to melt or sinter the material M to form the layers 3a and repeats the formation of the layers 3a to additively manufacture the shaped object 3 supported by the support surface 21a.

As illustrated in FIG. 2, a distal end 22a of the head 22 faces the shaped object 3 at an interval. The head 22 is provided with an emission path 22b and a discharge path 22c. The emission path 22b and the discharge path 22c are open to, for example, the distal end 22a.

The emission path 22b is a hole having a substantially circular cross section. The energy ray E is emitted to outside of the head 22 through the emission path 22b. The discharge path 22c is a hole having a substantially annular cross section and is provided so as to surround the emission path 22b. A carrier gas and the material M are discharged to outside of the head 22 through the discharge path 22c. The carrier gas is, for example, an inert gas such as nitrogen or argon.

As described above, the additive manufacturing system 1 according to the present embodiment is a coaxial nozzle system that supplies the energy ray E from substantially the center of the head 22 and supplies the carrier gas and the material M from the periphery thereof. However, the additive manufacturing system 1 may be a system including the head 22 that supplies the energy ray E and another nozzle that supplies the material M. Furthermore, the additive manufacturing system 1 may be a system that supplies the material M from the center of the head 22 and supplies the energy rays E from the periphery thereof.

The supply device 23 includes an optical device 31 and a material supply device 32. The optical device 31 includes, for example, a light source and an optical system. The light source includes an oscillation element and emits a laser beam as the energy ray E by oscillation of the oscillation element. The light source can change output (power) of the emitted energy ray E.

The light source causes the emitted energy ray E to be incident on the optical system. The energy ray E enters the head 22 through, for example, the optical system including an optical fiber. The optical system can change a focal diameter of the energy ray E. The optical device 31 supplies the energy ray E to the emission path 22b of the head 22 and emits the energy ray E from the emission path 22b.

The head 22 heats the discharged material M by irradiation with the energy ray E to melt or sinter the material M, thereby forming the layers 3a and performing annealing treatment. Furthermore, the head 22 can remove an unnecessary portion of the shaped object 3 by irradiation of the energy ray E.

The material supply device 32 accommodates the material M and supplies the material M to the head 22 with the carrier gas. The material supply device 32 supplies the carrier gas and the material M to the discharge path 22c of the head 22 via a pipe. Thus, the head 22 discharges the carrier gas and the material M from the discharge path 22c. The material supply device 32 can change an amount (mass or volume) of the material M to be discharged from the head 22 per unit time and speed of the discharged material M.

As illustrated in FIG. 1, the moving device 24 includes a first moving device 24a and a second moving device 24b. The first moving device 24a is connected to the table 21 and moves the table 21 in, for example, the X direction and the Y direction. The second moving device 24b is connected to the head 22 and moves the head 22 in the X direction, the Y direction, and the Z direction. In this manner, the moving device 24 moves the head 22 relative to the table 21. The moving device 24 only requires to move at least one of the table 21 or the head 22.

The moving device 24 may rotate at least one of the table 21 or the head 22 about a rotation axis extending in each of the X direction, the Y direction, and the Z direction. A direction in which the support surface 21a of the table 21 faces and a direction in which the distal end 22a of the head 22 faces may change by the rotation.

The measurement unit 12 measures states of respective layers 3a at the time of forming the layers 3a. The states of the layers 3a include shapes of surfaces of the layers 3a, surface roughness of the layers 3a, a geometric shape and temperature distribution of the molten region 3c forming the layers 3a, and various elements related to the layers 3a.

The measurement unit 12 includes a measuring instrument 41 and a connection portion 42. The measuring instrument 41 is, for example, a laser line sensor as a non-contact three-dimensional measuring instrument. Note that the measuring instrument 41 may be other instruments capable of measuring a three-dimensional shape, such as a three-dimensional scanner and a binocular camera. Further, the measuring instrument 41 may be a contact type three-dimensional measuring instrument.

The measuring instrument 41 is connected to the head 22 by the connection portion 42. In other words, the measurement unit 12 is connected to the head 22. Thus, the measurement unit 12 is moved relative to the table 21 by the moving device 24 together with the head 22.

The measuring instrument 41 may be movable relative to the head 22. For example, the measuring instrument 41 may be attached to a robot arm instead of being connected to the head 22. Further, in the three-dimensional printer of the PBF, the measuring instrument 41 is attached to, for example, a robot arm or a gate type moving device.

As illustrated in FIG. 2, the measuring instrument 41 includes an emission unit 41a. The emission unit 41a faces substantially in the same direction as the distal end 22a of the head 22. The measuring instrument 41 emits a line light beam L from the emission unit 41a.

The measuring instrument 41 scans a surface of the layer 3a or the base 3b formed by the head 22 with the line light beam L. For example, the surface of the layer 3a or the base 3b is scanned with the line light beam L in a direction (for example, the X direction) substantially orthogonal to a traveling direction (for example, the +Y direction) of the head 22 with respect to the table 21. As a result, the measuring instrument 41 measures a contour shape of the surface of the layer 3a or the base 3b scanned with the line light beam L.

The measuring instrument 41 continuously measures the contour shape of the surface of the layer 3a or the base 3b. The additive manufacturing system 1 can obtain a three-dimensional shape of the surface of the layer 3a or the base 3b by synthesizing a plurality of contour shapes obtained by the measuring instrument 41. In this manner, the measurement unit 12 measures the shapes of the surfaces of the layers 3a. The surfaces of the layers 3a become an internal structure of the shaped object 3. It can therefore also be said that the measurement unit 12 measures the internal structure of the shaped object 3.

The measuring instrument 41 is separated from the head 22 in a direction (for example, the −Y direction) opposite to the traveling direction of the head 22 with respect to the table 21. Thus, the measuring instrument 41 moves relative to the table 21 while following the head 22 forming the layers 3a.

The measuring instrument 41 can measure the shape of the surfaces of the layer 3a formed by the head 22 with the line light beam L slightly delayed from formation of the layer 3a. In other words, the measurement unit 12 can measure the shapes of the surfaces of the layers 3a formed by the head 22 substantially in real time. Note that the measurement unit 12 may measure the shape of the surface of the layer 3a being formed in real time or may measure the shape of the surface of the layer 3a after one layer 3a is completed.

The inspection unit 13 includes, for example, a CT scanner 45. The CT scanner 45 can measure the internal shape of the object on the basis of an X-ray (electromagnetic wave) which has passed through the object. The CT scanner 45 can measure the internal shape of the object with spatial resolution of, for example, several μm to several hundred μm. The inspection unit 13 may include other devices that can measure the internal shape of the object on the basis of the electromagnetic wave which has passed through the object. Furthermore, the inspection unit 13 may be a device different from the additive manufacturing system 1.

The control unit 14 is electrically connected to the shaping unit 11, the measurement unit 12, and the inspection unit 13 via a signal line. The control unit 14 may be, for example, a control unit provided integrally with the shaping unit 11 or may include a computer provided separately from the shaping unit 11.

The control unit 14 includes, for example, a control device such as a central processing unit (CPU) 14a, a read only memory (ROM) 14b, a random access memory (RAM) 14c, an external storage device 14d, an output device 14e, and an input device 14f, and has a hardware configuration using a normal computer. The CPU 14a, the ROM 14b, the RAM 14c, the external storage device 14d, the output device 14e, and the input device 14f are connected to each other with a bus or via an interface.

By the CPU 14a executing a program incorporated in the ROM 14b or the external storage device 14d, the control unit 14 controls each unit of the additive manufacturing system 1. For example, the control unit 14 controls the table 21, the head 22, the supply device 23, and the moving device 24 of the shaping unit 11, the measuring instrument 41 of the measurement unit 12, and the CT scanner 45 of the inspection unit 13.

The ROM 14b stores a program and data necessary for executing the program. The RAM 14c functions as a work area when a program is executed. The external storage device 14d is a device capable of storing, changing, and deleting data, such as a hard disk drive (HDD) or a solid state drive (SSD). The output device 14e is, for example, a display or a speaker. The input device 14f is, for example, a keyboard or a mouse.

Figure 3:
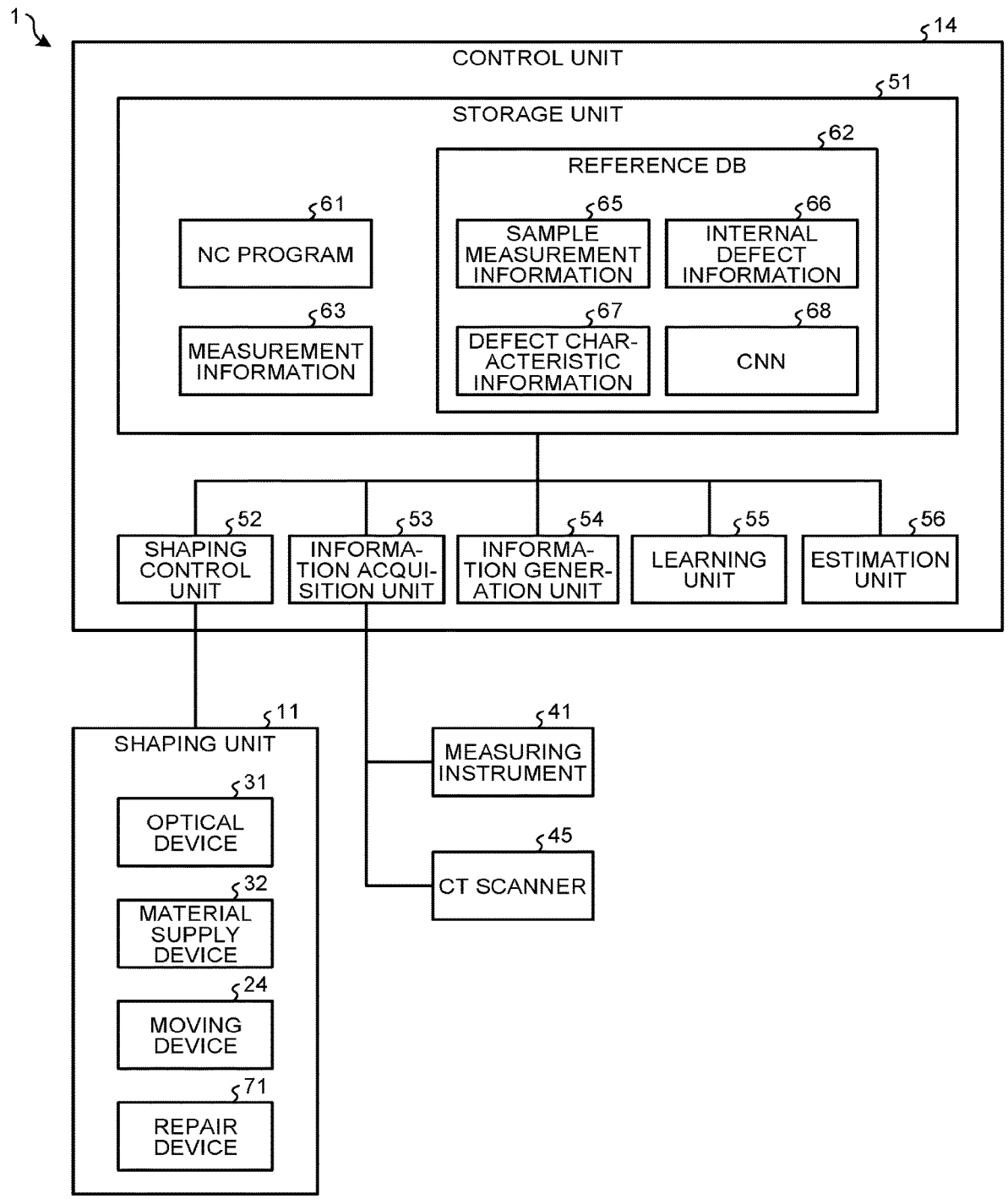
FIG. 3 is an exemplary block diagram functionally illustrating a configuration of the additive manufacturing system according to the first embodiment.

FIG. 3 is an exemplary block diagram functionally illustrating a configuration of the additive manufacturing system 1 of the first embodiment. The control unit 14 implements each unit illustrated in FIG. 3, for example, by the CPU 14a reading and executing a program stored in the ROM 14b or the external storage device 14d. As illustrated in FIG. 3, the control unit 14 includes, for example, a storage unit 51, a shaping control unit 52, an information acquisition unit 53, an information generation unit 54, a learning unit 55, and an estimation unit 56.

For example, the CPU 14a functions as the shaping control unit 52, the information acquisition unit 53, the information generation unit 54, the learning unit 55, and the estimation unit 56. In addition, the RAM 14c and the external storage device 14d function as the storage unit 51.

The storage unit 51 stores various types of information including an NC program 61, a reference database (DB) 62, and measurement information 63. The reference database 62 is an example of reference information.

The NC program 61 is information for shaping the plurality of layers 3a and the shaped object 3 including the layers 3a. The NC program 61 includes, for example, information on the shapes of the shaped object 3 and the layers 3a, the movement path of the head 22, and parameters of additive manufacturing at each coordinate on the movement path. The parameters of the additive manufacturing include, for example, moving speed of the head 22, a direction of the head 22, an amount of the material M to be discharged per unit time, speed of the material M to be discharged, and output of the energy ray E to be radiated. The NC program 61 may further include other information.

The shaping control unit 52 controls the shaping unit 11 including the optical device 31, the material supply device 32, and the moving device 24 on the basis of the NC program 61 to additively manufacture the plurality of layers 3a (shaped object 3). Furthermore, the shaping control unit 52 can stop the shaping unit 11.

The reference database 62 is used to estimate whether or not a defect will occur inside the shaped object 3 from a measurement result of the layer 3a by the measurement unit 12. The reference database 62 includes, for example, a plurality of pieces of sample measurement information 65, internal defect information 66, a plurality of pieces of defect characteristic information 67, and a convolutional neural network (CNN) 68. The CNN 68 is an example of a learning result. Note that the control unit 14 may have other neural networks different from the CNN 68 or other deep learning (machine learning) models. Furthermore, the reference database 62 may have information different from the sample measurement information 65, the internal defect information 66, the defect characteristic information 67, and the CNN 68.

In the present embodiment, the CNN 68 generated through machine learning based on the sample measurement information 65 and the internal defect information 66 associated with each other is used to estimate whether or not a defect will occur inside the shaped object 3. The sample measurement information 65 can include, for example, other information such as information on parameters of additive manufacturing included in the NC program 61 for additively manufacturing a sample and information on the material M of the sample, in addition to the measurement result of a shape of the sample for machine learning which will be described later. A feature amount calculated by the CNN 68 and the defect characteristic information 67 associated with the feature amount are used to estimate a size of a defect which will occur inside the shaped object 3. Note that the reference database 62 is not limited to this example, and the sample measurement information 65, the internal defect information 66, and the defect characteristic information 67 associated with each other may be used to estimate whether or not a defect will occur inside the shaped object 3. Furthermore, the reference database 62 may have a calculation formula or a program to be used to estimate whether or not a defect will occur inside the shaped object 3 on the basis of at least one of the sample measurement information 65, the internal defect information 66, or the defect characteristic information 67. In other words, the reference database 62 may be any information to be referred to for estimating whether or not a defect will occur inside the shaped object 3 from the measurement result of the layer 3a by the measurement unit 12 and is not limited to an aggregate of a large volume of information.

Hereinafter, an example of a method for acquiring the sample measurement information 65, the internal defect information 66, and the defect characteristic information 67 and a method for generating the CNN 68 will be described. Note that the sample measurement information 65, the internal defect information 66, the defect characteristic information 67, and the CNN 68 are not limited to the following examples.

Figure 4:
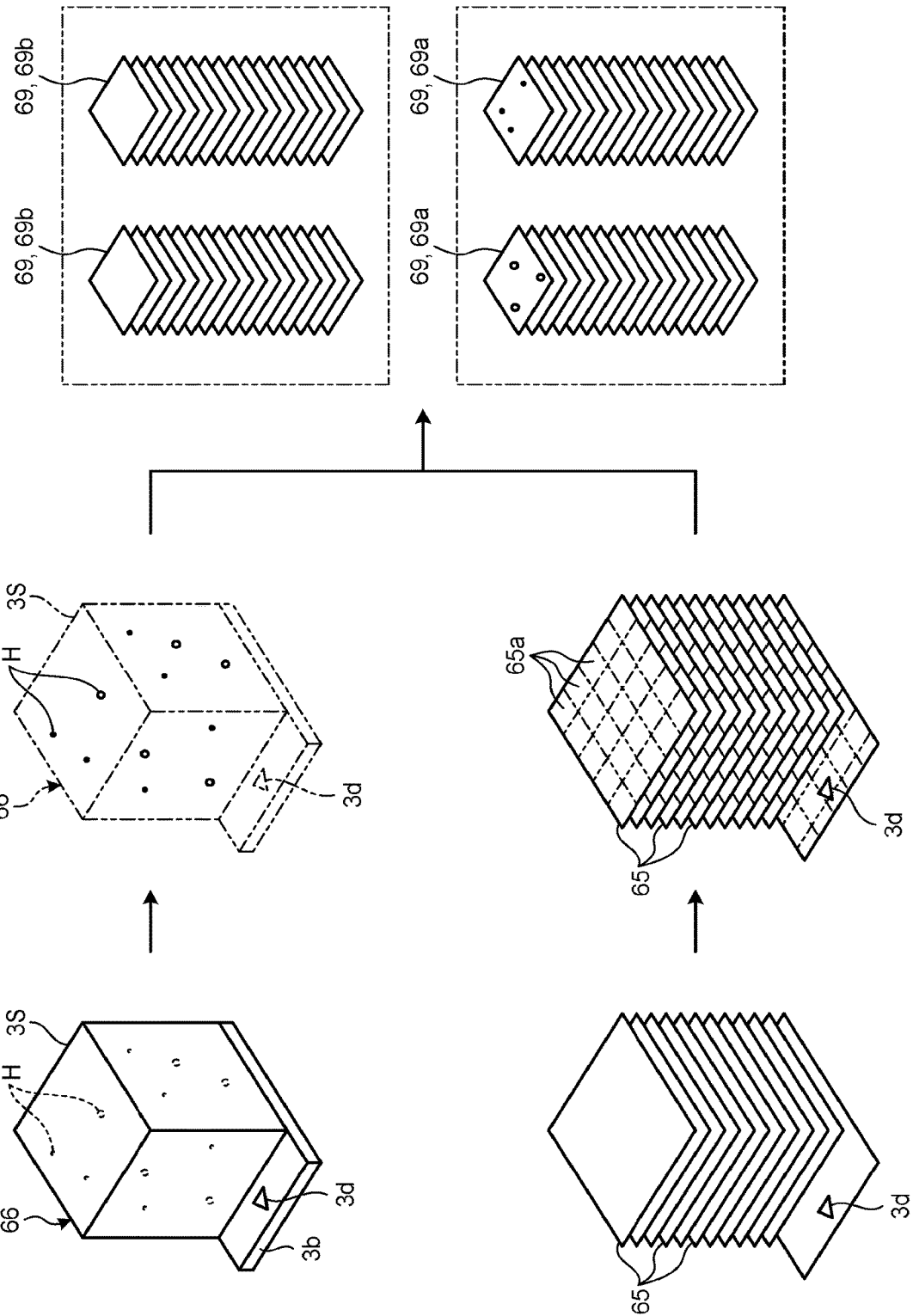
FIG. 4 is an exemplary diagram schematically illustrating procedure of creating a reference database according to the first embodiment.

FIG. 4 is an exemplary diagram schematically illustrating procedure of creating the reference database 62 according to the first embodiment. First, the shaping unit 11 additively manufactures a sample 3S. The sample 3S is an example of a sample object.

The sample 3S is the shaped object 3 shaped by the shaping unit 11. Thus, the sample 3S includes a plurality of layers 3a as with the other shaped objects 3. Further, the sample 3S includes the base 3b.

The sample 3S is formed as a substantially rectangular parallelepiped and has a size which allows the CT scanner 45 to measure an internal shape. For example, a height, a width, and a depth of the sample 3S are set to about 1 to 2 cm. The size of the sample 3S is not limited to this example.

The base 3b of the sample 3S has an alignment mark 3d. The alignment mark 3d is, for example, a recess recessed from a surface of the base 3b. As a result of the alignment mark 3d having a three-dimensional (stereoscopic) shape, the measuring instrument 41 and the CT scanner 45 can measure the alignment mark 3d.

In the example in FIG. 4, the alignment mark 3d is a substantially triangular recess. Note that the alignment mark 3d is not limited to this example. A plurality of alignment marks 3d may be provided on the base 3b.

The alignment mark 3d is exposed without being covered with the layers 3a even in a case where additive manufacturing of the shaped object 3 is completed. For example, the alignment mark 3d is provided on the surface of the base 3b on which the layers 3a are stacked and is separated from the layers 3a.

Every time one layer 3a is formed during the shaping of the sample 3S, the measurement unit 12 measures a shape of the surface of the layer 3a. The information acquisition unit 53 acquires a measurement result (electric signal) from the measurement unit 12. The information generation unit 54 generates sample measurement information 65 from the measurement result of the measurement unit 12 acquired by the information acquisition unit 53. In other words, the sample measurement information 65 indicates a measurement result of the three-dimensional shape of the surfaces of the layers 3a of the sample 3S measured by the measurement unit 12. Note that the information generation unit 54 may generate the sample measurement information 65 from, for example, information on parameters of additive manufacturing included in the NC program 61 for additively manufacturing the sample 3S and the information on the material M of the sample 3S in addition to the measurement results of the measurement unit 12 acquired by the information acquisition unit 53. In this case, for example, the information generation unit 54 may extract the information on the parameters of additive manufacturing from the NC program 61.

At an edge of the layer 3a where formation of the layer 3a is started or finished, speed of the head 22 and shaping conditions may become unstable. The measurement unit 12 measures, for example, a shape of a surface of a portion separated from the edge of the layer 3a. This enables the measurement unit 12 to measure the shapes of the surfaces of the layers 3a formed under stable shaping conditions. The measurement unit 12 may measure a shape of a surface around the edge of the layer 3a.

For example, the information generation unit 54 can obtain the sample measurement information 65 by performing image processing on the measurement result of the shape of the surface of the layer 3a measured by the measurement unit 12. The information on the shape of the surface of the layer 3a measured by the measurement unit 12 is a group of coordinates of the surface of the layer 3a scanned with the line light beam L.

As described above, the measurement unit 12 may measure the shape of the entire surface of the layer 3a including the periphery of the edge of the layer 3a. In this case, the information generation unit 54 may obtain the sample measurement information 65 by removing (trimming) a shape of a surface of a portion of the layer 3a shaped under unstable shaping conditions from the shape of the entire surface of the layer 3a measured by the measurement unit 12. This enables the information generation unit 54 to obtain the sample measurement information 65 related to the shape of the surface of the layer 3a formed under the stable shaping conditions.

The coordinate on the surface of the layer 3a is obtained, for example, from a position of the measuring instrument 41 with respect to the distal end 22a of the head 22, a relative position of the head 22 with respect to the table 21, and a distance between the surface of the layer 3a and the measuring instrument 41. The position of the measuring instrument 41 with respect to the distal end 22a of the head 22 is, for example, actually measured in advance. The relative position of the head 22 with respect to the table 21 is obtained from, for example, the NC program 61. The distance between the surface of the layer 3a and the measuring instrument 41 is obtained, for example, from a detection signal of the measuring instrument 41.

When the sample 3S is shaped, the sample 3S is disposed in an X-ray shielding chamber and imaged by the CT scanner 45. Before imaging by the CT scanner 45, part of the base 3b may be cut off. In this case, the alignment mark 3d is left without being cut off.

The information acquisition unit 53 acquires an imaging result (electric signal) of the sample 3S by computed tomography (CT) from the CT scanner 45. The information generation unit 54 generates internal defect information 66 on the basis of the imaging result of CT scanner 45 acquired by the information acquisition unit 53. The internal defect information 66 is the so-called CT image.

For example, in a case where the shaping conditions such as an amount of heat supplied from the energy ray E to the material M and cooling time of the molten region 3c are inappropriate, fusion at a boundary between the two layers 3a which overlap with each other may become insufficient. Thus, a defect H may occur inside the shaped object 3 (sample 3S). The defect H may cause decrease in tensile strength and fatigue strength of the shaped object 3.

The internal defect information 66 indicates the internal shape of the sample 3S. It is therefore possible to acquire information related to a shape, a size, and a coordinate of the defect H generated inside the sample 3S from the internal defect information 66. In other words, the internal defect information 66 indicates the defect H existing inside the sample 3S on the basis of an X-ray (electromagnetic wave) which has passed through the sample 3S.

Next, the information generation unit 54 divides the sample measurement information 65 in the horizontal direction to generate a plurality of divided portions 65a. The divided portion 65a is part of the sample measurement information 65 divided so as to have a predetermined size in the horizontal direction.

Next, for example, the information generation unit 54 extracts the defect H from the internal defect information 66 while regarding the defect H in the internal defect information 66 as a closed space. The information generation unit 54 superimposes the divided sample measurement information 65 and the internal defect information 66 from which the defect H is extracted. For example, the sample measurement information 65 and the internal defect information 66 can be superimposed by reading the sample measurement information 65 with CT data analysis software.

The information generation unit 54 provides a label of "defective" to the divided portion 65a which overlaps with the defect H in the internal defect information 66. In addition, the information generation unit 54 provides a label of "non-defective" to the divided portion 65a which does not overlap with the defect H in the internal defect information 66.

The sample measurement information 65 is superimposed on the internal defect information 66 on the basis of, for example, the alignment mark 3d. For example, the measurement unit 12 measures the shape of the alignment mark 3d when measuring the shape of the surface of the layer 3a or before measuring the shape of the surface of the layer 3a. As a result, at least one of the sample measurement information 65 includes information related to the alignment mark 3d.

For example, the information generation unit 54 sets the barycenter of the alignment mark 3d which is a triangle as a reference point (origin) of the coordinate in the sample measurement information 65. Other positions may be set as the reference point. The alignment mark 3d may be set as a reference point of the coordinate in the NC program 61.

The CT scanner 45 images the internal defect information 66 including the alignment mark 3d. As a result, the internal defect information 66 includes information related to the alignment mark 3d. The information generation unit 54 sets the barycenter of the alignment mark 3d which is a triangle as a reference point (origin) of the coordinate in the internal defect information 66.

The information generation unit 54 superimposes the sample measurement information 65 on the internal defect information 66 such that the reference point of the sample measurement information 65 coincides with the reference point of the internal defect information 66. In other words, the internal defect information 66 and the sample measurement information 65 are associated with each other on the basis of the alignment mark 3d included in the internal defect information 66 and the alignment mark 3d included in the sample measurement information. Superimposition of the divided portion 65a and the internal defect information 66 is not limited to this example.

The information generation unit 54 converts the plurality of divided portions 65a labeled as "defective" or "non-defective" into a plurality of images 69. The image 69 is a two-dimensional image. The plurality of images 69 includes a plurality of images 69a to which the label "defective" is provided and a plurality of images 69b to which the label "non-defective" is provided. The plurality of images 69 is used for machine learning as the so-called teacher data.

The information generation unit 54 generates defect characteristic information 67 about the image 69b to which the label "defective" is provided. The defect characteristic information 67 is information regarding a size of the defect H inside the sample 3S. The defect characteristic information 67 is, for example, information regarding a width, a length, a volume, a surface area, the number, and density of the defect H occurring inside the sample 3S at the position corresponding to the image 69b and is obtained from the internal defect information 66.

Next, the learning unit 55 performs machine learning on the basis of the plurality of images 69 and generates the CNN 68 as a learning result. The CNN 68 includes a plurality of layers such as a convolution layer, an activation function, pooling, fully connected, and a softmax function.

The learning unit 55 performs forward propagation of the CNN 68 using the image 69 as input. Furthermore, the learning unit 55 performs back propagation of the CNN 68 using an output value of the CNN 68 as input. The learning unit 55 updates the CNN 68 on the basis of the calculation results in the forward propagation and the back propagation. The learning unit 55 performs machine learning by repeating updating of the CNN 68.

For example, the CNN 68 calculates a feature amount of the image 69 related to occurrence of the defect H from the input image 69. The feature amount indicates whether or not a defect H occurs inside the sample 3S at a position corresponding to the image 69. Furthermore, in the present embodiment, the feature amount indicates information regarding a size of the defect H occurring inside the sample 3S at the position corresponding to the image 69.

As described above, the learning unit 55 performs machine learning on the basis of the image 69 based on the internal defect information 66 and the sample measurement information 65 and generates the CNN 68 as a learning result. Note that learning to be performed by the learning unit 55 is not limited to deep learning, and the learning unit 55 may perform other machine learning in which a pattern of a feature amount is learned on the basis of the feature amount determined in advance by a human.

Next, the information generation unit 54 associates the defect characteristic information 67 with the feature amount of the CNN 68. This enables the size of the defect H which will occur to be estimated on the basis of the feature amount calculated by the CNN 68. As described above, the reference database 62 for estimating occurrence of the defect H and the size of the defect H which will occur is generated on the basis of the sample measurement information 65, the internal defect information 66, and the defect characteristic information 67 and stored in the storage unit 51.

Figure 5:
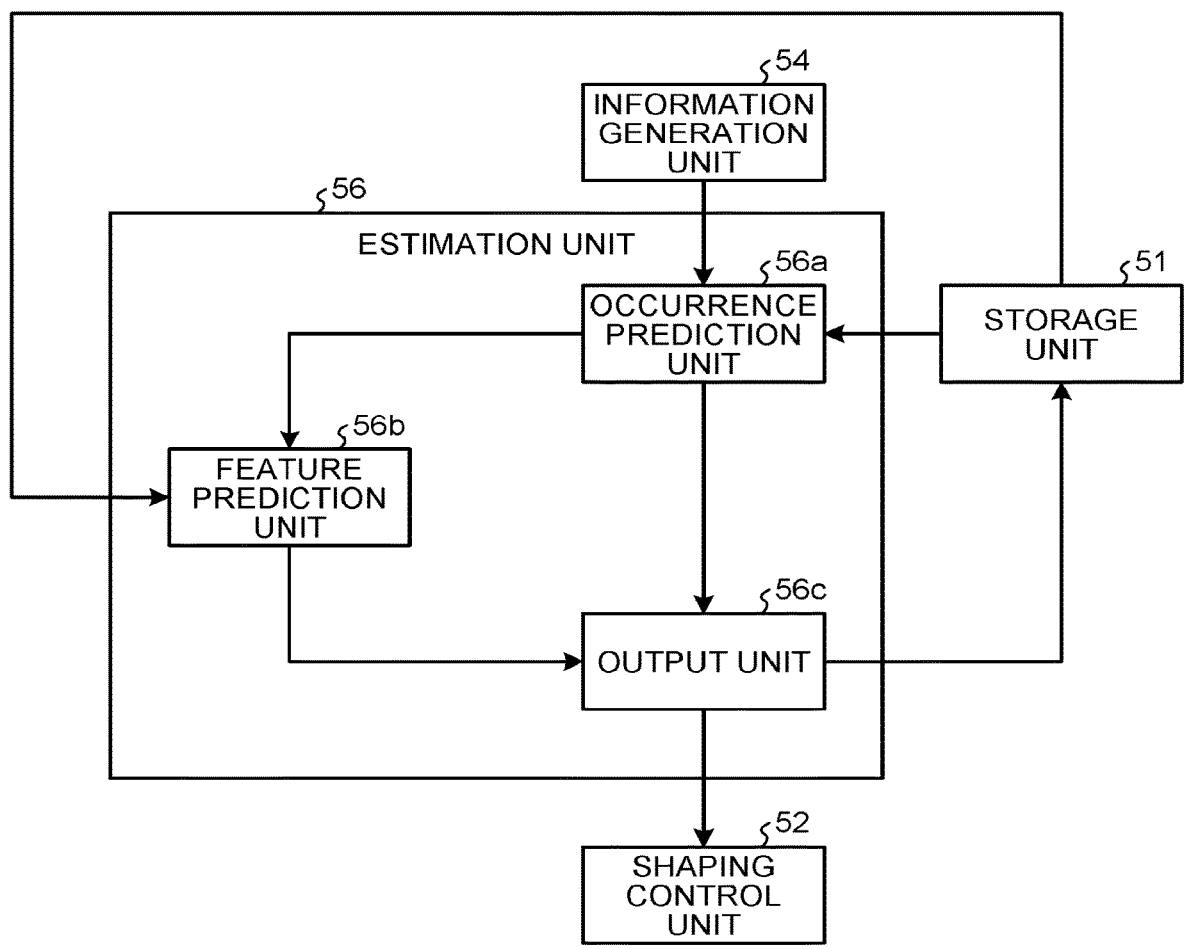
FIG. 5 is an exemplary block diagram functionally illustrating a configuration of an estimation unit according to the first embodiment.

FIG. 5 is an exemplary block diagram functionally illustrating a configuration of an estimation unit 56 according to the first embodiment. The estimation unit 56 estimates (predicts) whether or not a defect will occur inside the shaped object 3 on the basis of the measurement information 63 indicating the measurement result of the layer 3a of the shaped object 3 measured by the measurement unit 12 and the reference database 62. In other words, the estimation unit 56 predicts whether or not the defect H will occur when the next layer 3a is stacked on the layer 3a from the shape of the surface of that layer 3a. As illustrated in FIG. 5, the estimation unit 56 includes an occurrence prediction unit 56a, a feature prediction unit 56b, and an output unit 56c.

The occurrence prediction unit 56a acquires the CNN 68 from the storage unit 51. Furthermore, the occurrence prediction unit 56a acquires, from the information generation unit 54, the measurement information 63 indicating the measurement result of the layer 3a of the shaped object 3 measured by the measurement unit 12.

The measurement information 63 is generated as follows, for example. During shaping of the shaped object 3, the measurement unit 12 measures the shapes of the surfaces of the layers 3a. The information acquisition unit 53 acquires a measurement result (electric signal) from the measurement unit 12. The information generation unit 54 generates the measurement information 63 from the measurement results of the measurement unit 12 acquired by the information acquisition unit 53. Note that the information generation unit 54 may generate the measurement information 63 from, for example, information on parameters of additive manufacturing included in the NC program 61 for additively manufacturing the shaped object 3 and the information on the material M of the shaped object 3 in addition to the measurement results of the measurement unit 12 acquired by the information acquisition unit 53. In this case, for example, the information generation unit 54 may extract the information on the parameters of additive manufacturing from the NC program 61.

The measurement information 63 is, for example, a two-dimensional image indicating the shapes of at least part of the surface of the layer 3a. The measurement information 63 only requires to be information that can be used as input of the CNN 68. For example, in a case where the CNN 68 uses a three-dimensional image as input, the information generation unit 54 generates the measurement information 63 as a three-dimensional image.

The occurrence prediction unit 56a receives the measurement information 63 as input and calculates a feature amount as output from the CNN 68. The occurrence prediction unit 56a estimates whether or not the defect H will occur inside the shaped object 3 from the calculated feature amount.

In a case where the occurrence prediction unit 56a predicts occurrence of the defect H, the feature prediction unit 56b estimates (predicts) the size of the defect H. For example, the feature prediction unit 56b acquires the feature amount from the occurrence prediction unit 56a. Further, the feature prediction unit 56b acquires the defect characteristic information 67 from the storage unit 51. The feature prediction unit 56b estimates the size of the defect H from the feature amount with reference to the defect characteristic information 67.

The output unit 56c outputs the estimation results of the occurrence prediction unit 56a and the feature prediction unit 56b. For example, the output unit 56c stores the estimation results of the occurrence prediction unit 56a and the feature prediction unit 56b in the storage unit 51. The estimation results include, for example, information related to the coordinate and the size of the defect H which is predicted to occur. Furthermore, the output unit 56c may cause the shaping control unit 52 to repair the layer 3a by outputting the estimation result of the occurrence prediction unit 56a and the feature prediction unit 56b to the shaping control unit 52.

As illustrated in FIG. 3, the shaping unit 11 further includes a repair device 71. The repair device 71 is an example of a repair unit. The repair device 71 repairs the layer 3a on the basis of the estimation result of the estimation unit 56 by being controlled by the shaping control unit 52.

Figure 6:
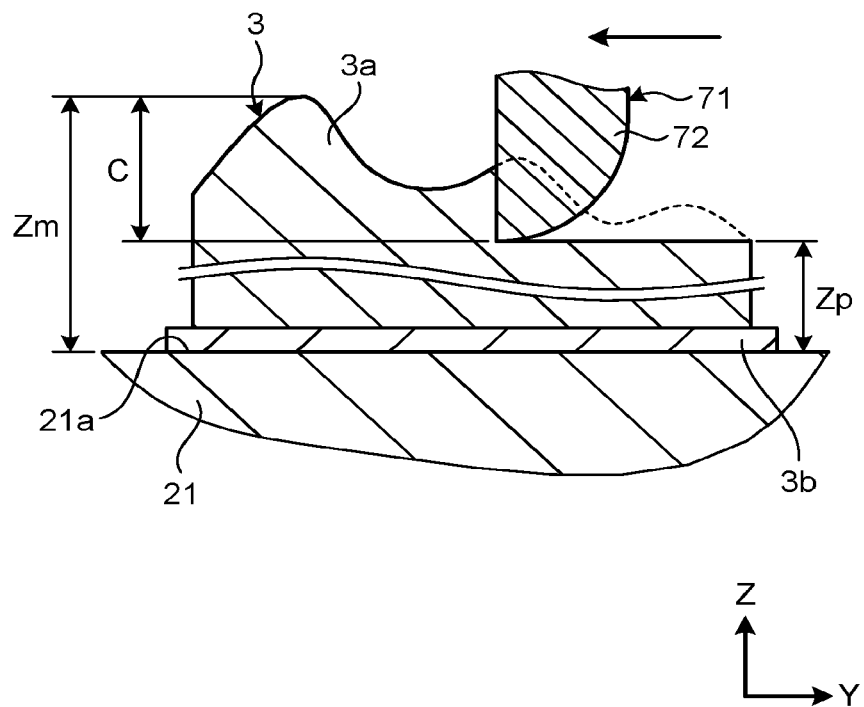
FIG. 6 is an exemplary cross-sectional view schematically illustrating a shaped object and a repair device of the first embodiment.

FIG. 6 is an exemplary cross-sectional view schematically illustrating a shaped object 3 and a repair device 71 of the first embodiment. As illustrated in FIG. 6, the repair device 71 includes, for example, a cutting unit 72. The cutting unit 72 is, for example, an end mill.

For example, the shaping control unit 52 calculates a maximum height Zm and a cutting allowance C on the basis of the shape of the surface of the layer 3a measured by the measurement unit 12. The maximum height Zm is a maximum value of the coordinate in the Z direction (thickness direction) on the surface of the layer 3a. The cutting allowance C is a difference between a maximum value and a minimum value of the coordinate in the Z direction on the surface of the layer 3a. The coordinate in the Z direction is based on the alignment mark 3d of the base 3b or the support surface 21a of the table 21.

A distal end of the cutting unit 72 is disposed at a machining height Zp which is a difference between the maximum height Zm and the cutting allowance C. The cutting unit 72 located at the machining height Zp cuts the layer 3a, so that the surface of the layer 3a are machined to be substantially flat.

As illustrated in FIG. 6, in a case where undulation of unevenness formed on the surface of the layer 3a is large, the defect H is more likely to occur inside the shaped object 3. By the repair device 71 machining the surface of the layer 3a to be substantially flat, a probability that the defect H occurs inside the shaped object 3 is reduced.

The repair device 71 may scrape off the layer 3a having a surface measured or the plurality of layers 3a including that layer 3a. In this case, the defect H is prevented from occurring inside the shaped object 3 by the shaping unit 11 forming the scraped layer 3a again.

In a case where the repair device 71 can repair the shaped object 3 provided on the table 21, the repair device 71, for example, repairs the layer 3a with reference to the reference point in the NC program 61. In a case where the repair device 71 repairs the shaped object 3 provided at a position different from the table 21, the repair device 71 reads the alignment mark 3d with, for example, a camera, and sets a reference point at the alignment mark 3d.

Figure 7:
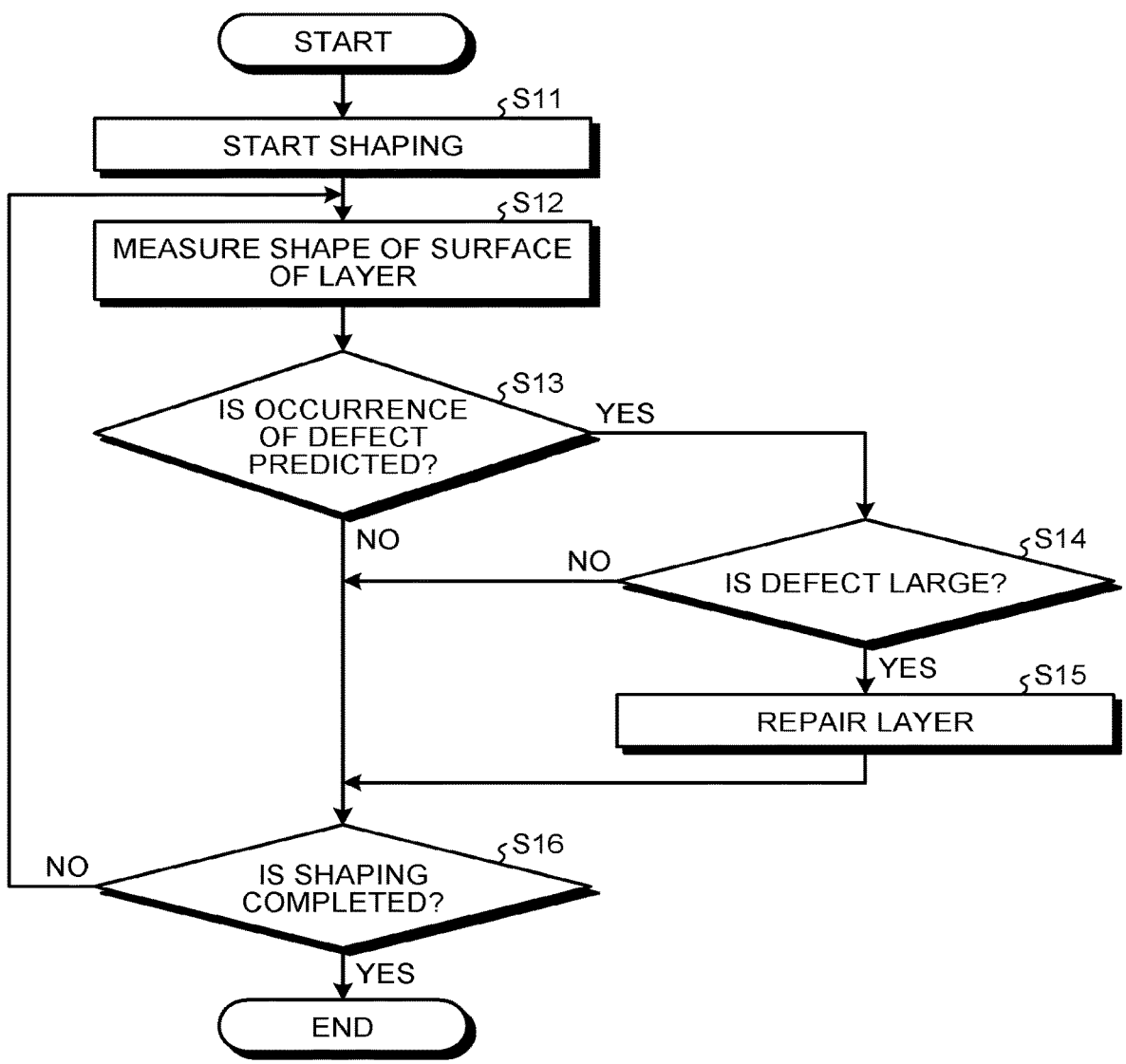
FIG. 7 is an exemplary flowchart illustrating an example of an additive manufacturing method according to the first embodiment.

FIG. 7 is an exemplary flowchart illustrating an example of an additive manufacturing method according to the first embodiment. Additive manufacturing by the additive manufacturing system 1 will be described below with reference to FIG. 7. Note that the additive manufacturing method which will described below with reference to FIG. 7 is merely an example, and the additive manufacturing system 1 may perform additive manufacturing using other methods.

As illustrated in FIG. 7, first, the shaping unit 11 starts additive manufacturing on the basis of the NC program 61 (S11). Next, the measuring instrument 41 of the measurement unit 12 measures the shape of the surface of the layer 3a (S12). For example, after completion of one layer 3a, the measurement unit 12 measures the shape of the surface of the layer 3a. Note that the measurement unit 12 may scan the surface of the layer 3a with the line light beam L in real time. In this case, when the number of contour shapes of the scanned surface of the layer 3a reaches a predetermined number, the information generation unit 54 generates the measurement information 63 indicating the shape of part of the surface of the layer 3a from the plurality of contour shapes.

Next, the occurrence prediction unit 56a of the estimation unit 56 predicts whether or not the defect H will occur inside the shaped object 3 (S13). The occurrence prediction unit 56a calculates a feature amount on the basis of the measurement information 63 and the CNN 68. The occurrence prediction unit 56a predicts whether or not the defect H will occur inside the shaped object 3 from the calculated feature amount. For example, in a case where the feature amount exceeds a threshold value, the occurrence prediction unit 56a determines that the defect H will occur at the position corresponding to the measurement information 63.

In a case where it is predicted that the defect H will occur inside the shaped object 3 (S13: Yes), the feature prediction unit 56b predicts whether or not a size of the defect H is larger than a predetermined size (for example, 50 μm) (S14). The predetermined size can be determined by, for example, verification such as a tensile test of the sample 3S.

The feature prediction unit 56b predicts the size of the defect H from the feature amount calculated by the occurrence prediction unit 56a and the defect characteristic information 67. The feature prediction unit 56b determines whether or not the predicted size of the defect H is larger than a predetermined size of the defect H that may affect quality of the shaped object 3. Note that the feature prediction unit 56b may simply compare the feature amount with the threshold value.

S13 and S14 may be integrated. In other words, the estimation unit 56 may estimate at one time whether the defect H will not occur, the defect H smaller than a predetermined size will occur, or the defect H larger than the predetermined size will occur inside the shaped object 3 on the basis of the measurement information 63 and the CNN 68.

In a case where the size of the defect H is predicted to be larger than the predetermined size (S14: Yes), the shaping control unit 52 controls the repair device 71 to repair the layer 3a (S15). The repair of the layer 3a in S15 may be omitted. In this case, for example, the coordinate (map) in which the defect H is predicted to occur in the shaped object 3 is stored in the storage unit 51. The map can be used for quality control of the shaped object 3 such as traceability. Further, instead of repairing the layer 3a in S15, the additive manufacturing may be stopped.

When the layer 3a is repaired, the shaping control unit 52 determines whether or not the additive manufacturing is completed (S16). In a case where the additive manufacturing is not completed (S16: No), the processing returns to S12, and the measurement unit 12 measures the shape of the surface of the layer 3a again.

In a case where the defect H is not predicted to occur in S13 (S13: No), and in a case where the size of the defect H is predicted to be smaller than the predetermined size in S14 (S14: No), the shaping control unit 52 determines whether or not the additive manufacturing is completed (S16). In a case where the additive manufacturing is completed in S16 (S16: Yes), the additive manufacturing in the additive manufacturing system 1 ends.

As described above, the estimation unit 56 estimates whether or not the defect H will occur inside the shaped object 3 on the basis of the CNN 68 based on the internal defect information 66 and the sample measurement information 65 and the measurement information 63. Furthermore, the estimation unit 56 estimates whether or not the defect H larger than the predetermined size or the defect H smaller than the predetermined size will occur inside the shaped object 3 on the basis of the feature amount based on the measurement information 63 and the CNN 68 and the defect characteristic information 67. The defect H larger than the predetermined size is an example of a first defect. The defect H smaller than the predetermined size is an example of a second defect. In addition, in a case where the estimation unit 56 estimates that a plurality of defects H smaller than the predetermined size but densely arranged will occur, the plurality of defects H may be regarded as one defect H larger than the predetermined size. The one defect H is also an example of the first defect.

In a case where the estimation unit 56 estimates that the defect H larger than the predetermined size will occur inside the shaped object 3, the shaping unit 11 repairs the layer 3a by the repair device 71. On the other hand, in a case where the estimation unit 56 estimates that the defect H smaller than the predetermined size will occur inside the shaped object 3, the shaping unit 11 continues the additive manufacturing of the shaped object 3.

The program to be executed by the control unit 14 of the present embodiment is provided by being recorded in a computer-readable recording medium such as a CD-ROM, a flexible disk (FD), a CD-R, or a digital versatile disk (DVD) as a file in an installable format or an executable format.

In addition, the program to be executed by the control unit 14 of the present embodiment may be stored on a computer connected to a network such as the Internet and provided by being downloaded via the network. Furthermore, the program to be executed by the control unit 14 of the present embodiment may be provided or distributed via a network such as the Internet.

In addition, the program of the present embodiment may be provided by being incorporated in a ROM, or the like, in advance.

The program to be executed by the control unit 14 of the present embodiment has a module configuration including each unit (the shaping control unit 52, the information acquisition unit 53, the information generation unit 54, the learning unit 55, and the estimation unit 56) described above, and as actual hardware, the CPU (processor) reads the program from the storage medium and executes the program, so that each unit is loaded on a main storage device, and the shaping control unit 52, the information acquisition unit 53, the information generation unit 54, the learning unit 55, and the estimation unit 56 are generated on the main storage device.

In the additive manufacturing system 1 according to the first embodiment described above, the storage unit 51 stores the reference database 62 based on the internal defect information 66 indicating the defect H existing inside the sample 3S based on the X-ray (electromagnetic wave) which has passed through the sample 3S and the sample measurement information 65 indicating the measurement results of the plurality of layers 3a of the sample 3S measured by the measurement unit 12. The estimation unit 56 estimates whether or not the defect H will occur inside the shaped object 3 on the basis of the measurement information 63 indicating the measurement results of the plurality of layers 3a of the shaped object 3 measured by the measurement unit 12 and the reference database 62. It is therefore possible to estimate whether or not the defect H will occur inside the shaped object 3 to be shaped during the additive manufacturing. Occurrence of the defect H can be estimated before the defect H occurs, and thus, it is not necessary to repair the shaped object 3 after the defect H occurs, so that it is possible to reduce material cost and a shaping period of the shaped object 3. Furthermore, it is also possible to prevent the shaped object 3 from being discarded due to degradation of quality due to the defect H.

Typically, there is a case where the defect H of the shaped object 3 can be detected using the CT scanner. However, in detection of the defect H by the CT scanner, the size of the shaped object 3 for which the defect H can be detected is limited to a range which can be irradiated with the X-ray by the CT scanner. Thus, the shaped object 3 may be cut (destroyed) for detecting the defect H using the CT scanner. In detection of the defect H by the CT scanner, the shaped object 3 is moved to an X-ray shielding chamber, so that it is difficult to detect the defect H during shaping. For this reason, the shaped object 3 may be discarded due to degradation of quality due to the defect H detected after completion of the additive manufacturing. Furthermore, in detection of the defect H by the CT scanner, detection accuracy changes depending on a material (specific gravity) of the shaped object 3.

The additive manufacturing system 1 of the present embodiment can provide advantages that the size of the shaped object 3 that can be measured is less limited, occurrence of the defect H can be estimated during shaping of the shaped object 3, and accuracy is less changed depending on the material of the shaped object 3 compared to a system that detects the defect H of the shaped object 3 by the CT scanner. Furthermore, the additive manufacturing system 1 of the present embodiment can provide an advantage that occurrence of the defect H can be estimated without destroying the shaped object 3. Furthermore, the additive manufacturing system of the present embodiment can provide an advantage that occurrence of the defect H can be estimated before the defect H occurs compared to other systems that detect the defect H already occurring inside the shaped object 3.

The learning unit 55 performs machine learning on the basis of the internal defect information 66 and the sample measurement information 65 to generate the CNN 68. The reference database 62 includes the CNN 68. By using machine learning, the additive manufacturing system 1 can more accurately and easily estimate occurrence of the defect H.

The internal defect information 66 is based on an imaging result of the sample 3S by computed tomography (CT). By this means, if the sample 3S is imaged by the CT scanner 45, occurrence of the defect H can be estimated with substantially the same accuracy as detection of the defect H by CT without actually imaging the shaped object 3 by the CT scanner 45.

The measurement unit 12 measures the shape of the surface of each layer 3a. The estimation unit 56 estimates whether or not the defect H will occur inside the shaped object 3 on the basis of the measurement information 63 indicating the shape of the surface of the layer 3a of the shaped object 3 and the sample measurement information 65 and the internal defect information 66 indicating the shape of the surface of the layer 3a of the sample 3S. For example, in a case where undulation of unevenness formed on the surface of the layer 3a is large, the defect H is highly likely to occur inside the shaped object 3. Thus, whether or not the defect H will occur inside the shaped object 3 can be estimated by using the measurement result of the shape of the surface of the layer 3a.

The measurement unit 12 includes the measuring instrument 41 that is a non-contact three-dimensional measuring instrument. This enables whether or not the defect H will occur inside the shaped object 3 to be shaped to be more quickly estimated during the shaping.

The measurement unit 12 is connected to the head 22 of the shaping unit 11 and is moved relative to the table 21 by the moving device 24 together with the head 22. This reduces limitation on the size of the shaped object 3 that can be measured by the measurement unit 12. The measurement unit 12 can perform measurement as long as the shaped object 3 has a size that can be additively manufactured by the shaping unit 11.

The repair device 71 repairs the layer 3a on the basis of the estimation result of the estimation unit 56. For example, in a case where the estimation unit 56 estimates that the defect H will occur inside the shaped object 3, the repair device 71 repairs the layer 3a so as to prevent occurrence of the defect H. This can prevent occurrence of the defect H inside the shaped object 3.

The reference database 62 is based on the internal defect information 66, the sample measurement information 65, and the defect characteristic information 67 related to the size of the defect H existing inside the sample 3S. In a case where the estimation unit 56 estimates that the defect H larger than the predetermined size will occur inside the shaped object 3, the shaping unit 11 repairs the layer 3a by the repair device 71. In a case where the estimation unit 56 estimates that the defect H smaller than the predetermined size will occur inside the shaped object 3, the shaping unit 11 continues shaping. This can omit unnecessary repair, so that it is possible to prevent increase of time required for additive manufacturing.

The internal defect information 66 and the sample measurement information 65 are associated with each other on the basis of the alignment mark 3d included in the internal defect information 66 and the alignment mark 3d included in the sample measurement information 65. This enables the reference database 62 for estimating occurrence of the defect H more accurately to be obtained on the basis of the internal defect information 66 and the sample measurement information 65.

Second Embodiment

A second embodiment will be described below with reference to FIG. 8. Note that in the following description of a plurality of embodiments, the same reference signs as the reference signs of the components described above will be assigned to components having functions similar to those of the components already described, and the description thereof may be omitted. In addition, the plurality of components to which the same reference signs are assigned do not necessarily have all the functions and properties in common and may have different functions and properties according to each embodiment.

In the second embodiment, the estimation unit 56 estimates whether or not the defect H will occur inside the shaped object 3 on the basis of surface roughness of the layer 3a instead of the shape of the surface of the layer 3a. In other words, the measurement information 63 in the second embodiment is the surface roughness of at least part of the layer 3a.

For example, during shaping of the shaped object 3, the measurement unit 12 measures the shape of the surface of the layer 3a. The information acquisition unit 53 acquires a measurement result (electric signal) from the measurement unit 12. The information generation unit 54 calculates the surface roughness of the layer 3a from the measurement result of the shape of the surface of the layer 3a acquired by the information acquisition unit 53.

The sample measurement information 65 in the second embodiment is the surface roughness of the layer 3a of the sample 3S measured by the measurement unit 12. In the reference database 62 of the second embodiment, correlation between the surface roughness of the layer 3a and whether or not the defect H occurs is defined on the basis of the sample measurement information 65 and the internal defect information 66. Furthermore, in the reference database 62 of the second embodiment, for example, correlation between the surface roughness of the layer 3a and the size of the defect H which will occur is defined on the basis of the sample measurement information 65, the internal defect information 66, and the defect characteristic information 67. The correlation may be calculated in advance by a human or may be calculated by the learning unit 55.

In the estimation unit 56 of the second embodiment, the occurrence prediction unit 56a estimates whether or not the defect H will occur inside the shaped object 3 on the basis of the measurement information 63 indicating the surface roughness of the layer 3a and the reference database 62. For example, from the correlation between the surface roughness of the layer 3a and whether or not the defect H occurs defined in the reference database 62, a threshold value as to whether or not the defect H will occur inside the shaped object 3 is obtained. The occurrence prediction unit 56a compares the surface roughness of the measurement information 63 with the threshold value to estimate whether or not the defect H will occur inside the shaped object 3.

In the estimation unit 56 of the second embodiment, the feature prediction unit 56b estimates the size of the defect H on the basis of the measurement information 63 indicating the surface roughness of the layer 3a and the reference database 62. For example, from the correlation between the surface roughness of the layer 3a and the size of the defect H which will occur defined in the reference database 62, a threshold as to whether or not the defect H is larger than a predetermined size is obtained. The feature prediction unit 56b compares the surface roughness of the measurement information 63 with the threshold value to estimate whether or not the defect H is larger than the predetermined size.

Figure 8:
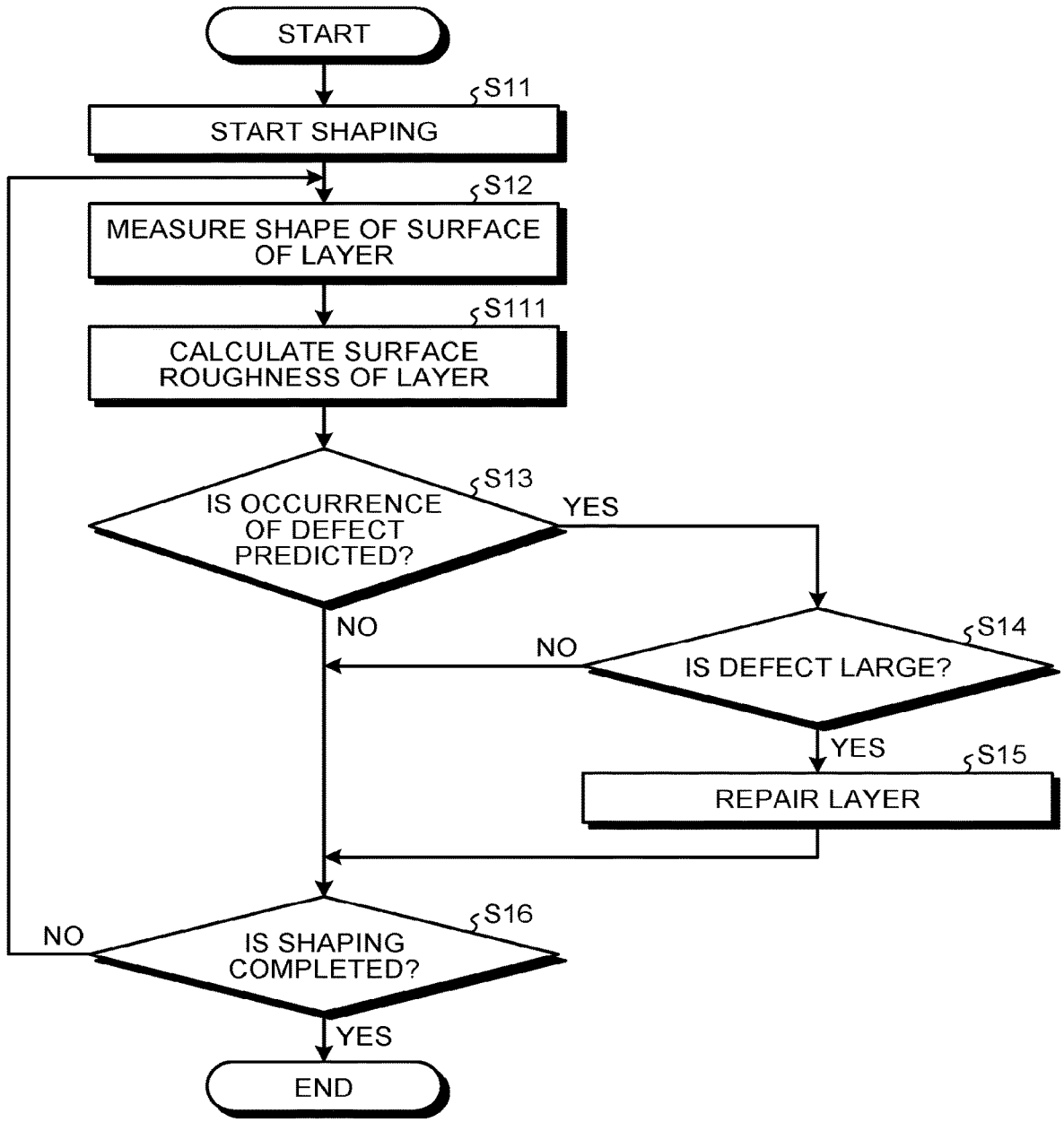
FIG. 8 is an exemplary flowchart illustrating an example of an additive manufacturing method according to a second embodiment.

FIG. 8 is an exemplary flowchart illustrating an example of an additive manufacturing method according to the second embodiment. Additive manufacturing by the additive manufacturing system 1 according to the second embodiment will be described below with reference to FIG. 8.

First, as in the first embodiment, the shaping unit 11 starts additive manufacturing on the basis of the NC program 61 (S11), and the measurement unit 12 measures the shape of the surface of the layer 3a (S12). Next, the information generation unit 54 calculates surface roughness of the layer 3a from the measurement result of the layer 3a of the shaped object 3 measured by the measurement unit 12 (S111).

The measurement result of the layer 3a of the shaped object 3 measured by the measurement unit 12 indicates the three-dimensional shape of the surface of the layer 3a of the shaped object 3. Thus, the information generation unit 54 can calculate the surface roughness of the layer 3a from the measurement result. In other words, the measurement unit 12 in the second embodiment indirectly measures the surface roughness of each of the plurality of layers 3a. The measurement unit 12 may be a device that directly measures the surface roughness of the layer 3a.

Next, the occurrence prediction unit 56a of the estimation unit 56 predicts whether or not the defect H will occur inside the shaped object 3 (S13). As described above, for example, the occurrence prediction unit 56a compares the surface roughness of the layer 3a with the threshold value to predict whether or not the defect H will occur inside the shaped object 3.

In a case where it is predicted that the defect H will occur inside the shaped object 3 (S13: Yes), the feature prediction unit 56b predicts whether or not a size of the defect H is larger than a predetermined size (S14). As described above, for example, the feature prediction unit 56b compares the surface roughness of the layer 3a with the threshold value to predict whether or not the size of the defect H is larger than the predetermined size.

In a case where the defect H is predicted to be larger than the predetermined size (S14: Yes), the shaping control unit 52 controls the repair device 71 to repair the layer 3a (S15). When the layer 3a is repaired, the shaping control unit 52 determines whether or not the additive manufacturing is completed (S16). In a case where the additive manufacturing is not completed (S16: No), the processing returns to S12, and the measurement unit 12 measures the shape of the surface of the layer 3a again.

In a case where the defect H is not predicted to occur in S13 (S13: No), and in a case where the defect H is predicted to be smaller than the predetermined size in S14 (S14: No), the shaping control unit 52 determines whether or not the additive manufacturing is completed (S16). In a case where the additive manufacturing is completed in S16 (S16: Yes), the additive manufacturing in the additive manufacturing system 1 ends.

In the additive manufacturing system 1 of the second embodiment described above, the measurement unit 12 measures the surface roughness of each of the layers 3a. The estimation unit 56 estimates whether or not the defect H will occur inside the shaped object 3 on the basis of the measurement information 63 indicating the surface roughness of the layer 3a of the shaped object 3 and the sample measurement information 65 and the internal defect information 66 indicating the surface roughness of the layer 3a of the sample 3S. For example, in a case where the surface roughness of the layer 3a is large and the average height of the layer 3a is low, the defect H is highly likely to occur inside the shaped object 3. Thus, whether or not the defect H will occur inside the shaped object 3 can be estimated by using the measurement result of the surface roughness of the layer 3a.

Third Embodiment

Figure 9:
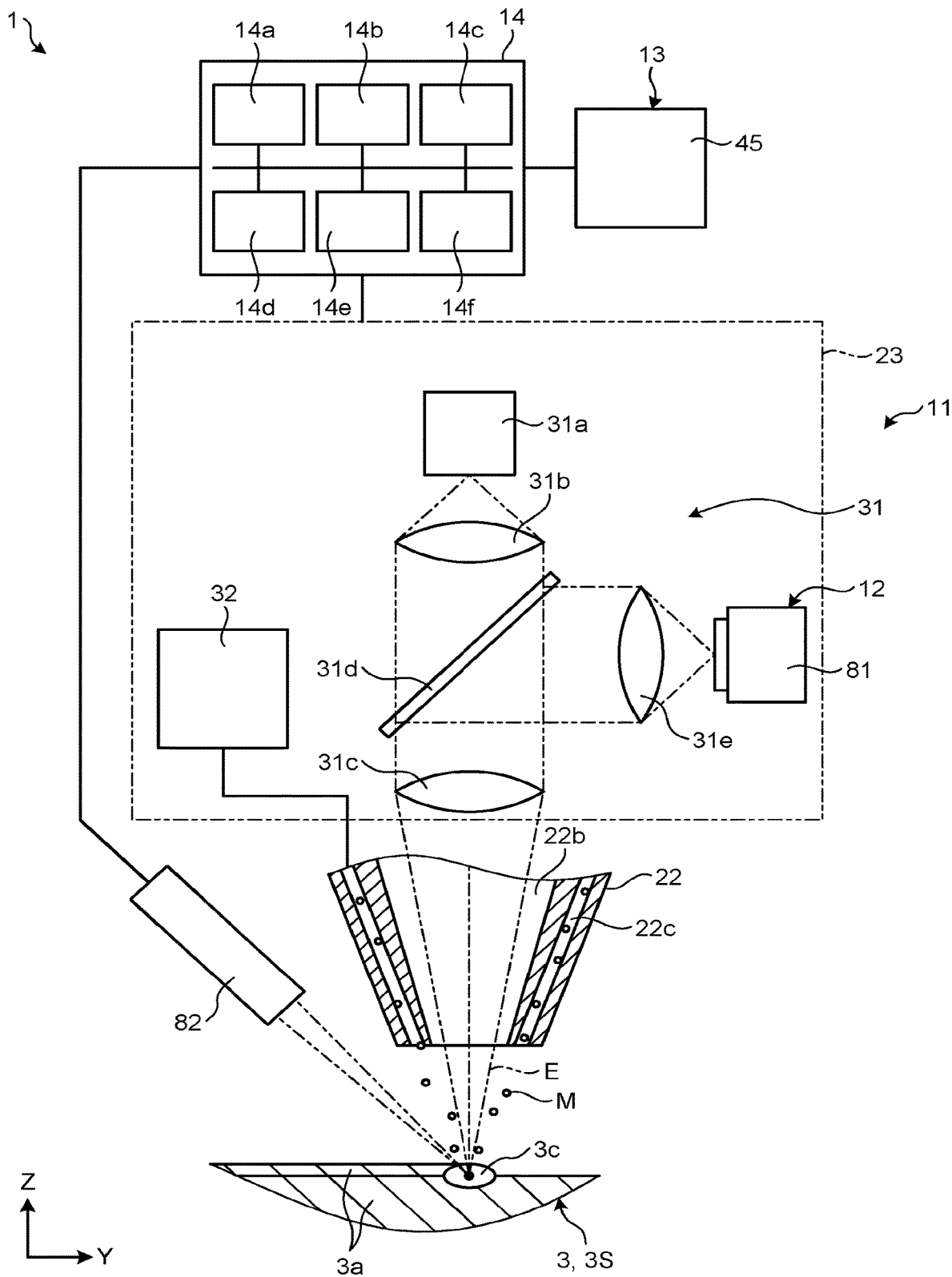
FIG. 9 is an exemplary cross-sectional view schematically illustrating an additive manufacturing system according to a third embodiment.

A third embodiment will be described below with reference to FIG. 9 to FIG. 13. FIG. 9 is an exemplary cross-sectional view schematically illustrating an additive manufacturing system 1 according to the third embodiment. As illustrated in FIG. 9, the measurement unit 12 of the third embodiment includes a measuring instrument 81 and a distance meter 82 instead of the measuring instrument 41 and the connection portion 42.

The measuring instrument 81 is, for example, an infrared camera. The measuring instrument 81 measures a geometric shape and temperature distribution of the molten region 3c forming the layer 3a. In other words, the measuring instrument 81 measures the material M that is melted by the shaping unit 11 to form the layer 3a. Note that the measuring instrument 81 may be other instruments such as a CCD camera. In this case, the measuring instrument 81 measures the geometric shape of the molten region 3c.

The measuring instrument 81 can image the molten region 3c coaxially with the energy ray E using, for example, the optical device 31. For example, the optical device 31 of the third embodiment includes a light source 31a, a collimator lens 31b, a first condenser lens 31c, a half mirror 31d, and a second condenser lens 31e.

The light source 31a includes an oscillation element and emits a laser beam as the energy ray E by oscillation of the oscillation element. The collimator lens 31b converts, for example, the energy ray E incident through an optical fiber into parallel light. The first condenser lens 31c condenses the parallel light and emits the parallel light from the emission path 22b of the head 22. The half mirror 31d is located in the optical path between the collimator lens 31b and the first condenser lens 31c. Light from the collimator lens 31b toward the first condenser lens 31c passes through the half mirror 31d. The second condenser lens 31e condenses light reflected by the half mirror 31d and causes the light to be incident on the measuring instrument 81.

For example, radiation light is generated in the molten region 3c. The emitted light is incident on the half mirror 31d through the emission path 22b of the head 22 and the first condenser lens 31c. The radiation light is reflected by the half mirror 31d and is incident on the light receiving portion of the measuring instrument 81 through the second condenser lens 31e. Accordingly, the measuring instrument 81 can image the molten region 3c coaxially with the energy ray E. Further, according to the above configuration, it is not necessary to bring the measuring instrument 81 close to the molten region 3c, and it is possible to reduce influence of a temperature of the molten region 3c and dust.

The distance meter 82 is, for example, a laser distance meter. Note that the distance meter 82 is not limited to this example. The distance meter 82 is connected to the head 22 and is moved relative to the table 21 by the moving device 24 together with the head 22.

The distance meter 82 measures, for example, a distance between the distance meter 82 and the molten region 3c. For example, the coordinate of the molten region 3c is obtained on the basis of the measurement result of the distance meter 82, an actually measured distance between the distance meter 82 and the head 22, and the coordinate of the head 22 in the NC program 61. Note that the measurement unit 12 may include a device capable of measuring a distance, such as a 3D scanner, instead of the distance meter 82.

Figure 10:
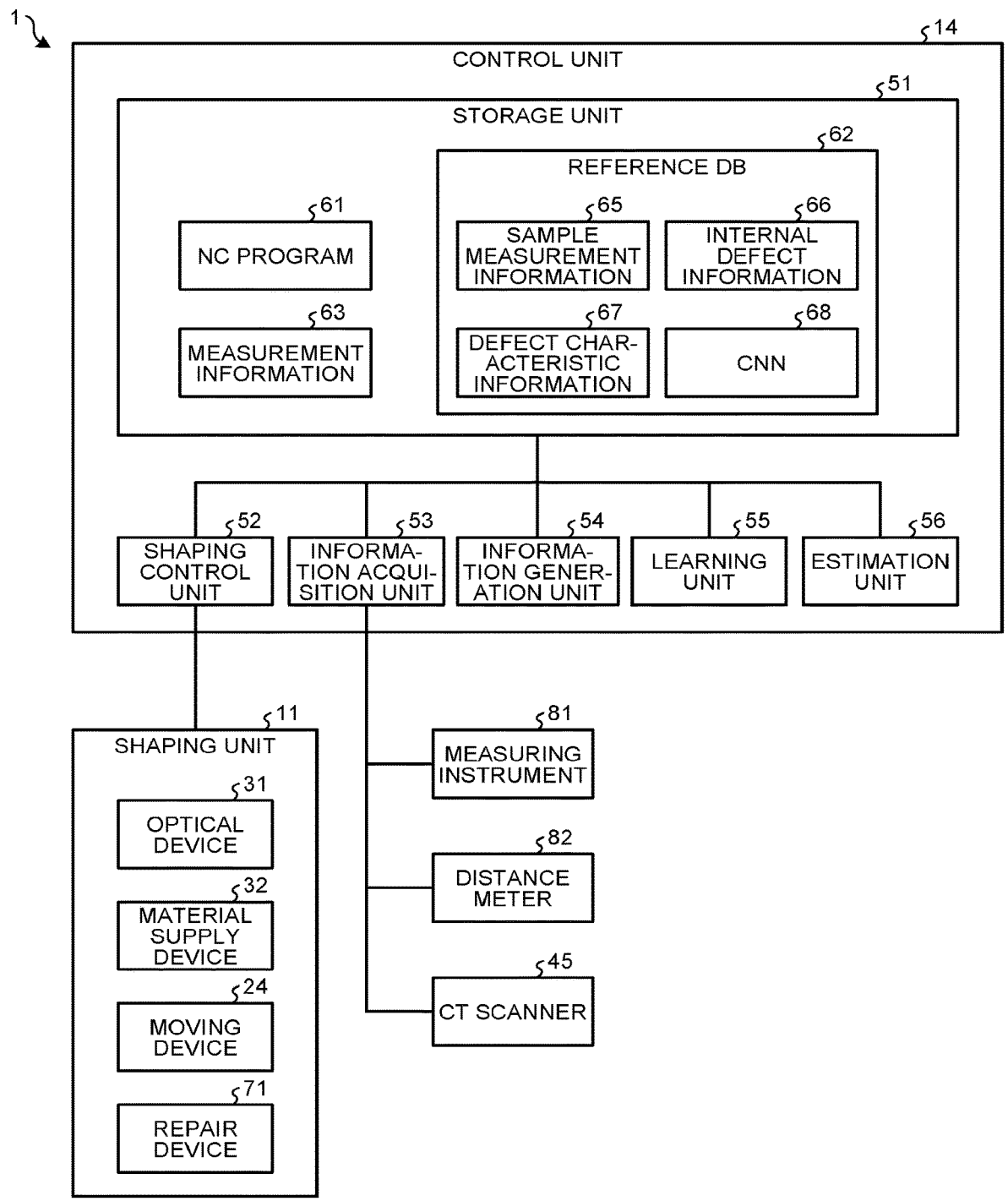
FIG. 10 is an exemplary block diagram functionally illustrating a configuration of the additive manufacturing system according to the third embodiment.

FIG. 10 is an exemplary block diagram functionally illustrating a configuration of the additive manufacturing system 1 according to the third embodiment. As illustrated in FIG. 10, in the third embodiment, the information acquisition unit 53 acquires the measurement results of the shape and temperature distribution of the molten region 3c from the measuring instrument 81. In addition, the information acquisition unit 53 acquires, from the distance meter 82, the measurement result of the distance between the distance meter 82 and the molten region 3c.

Figure 11:
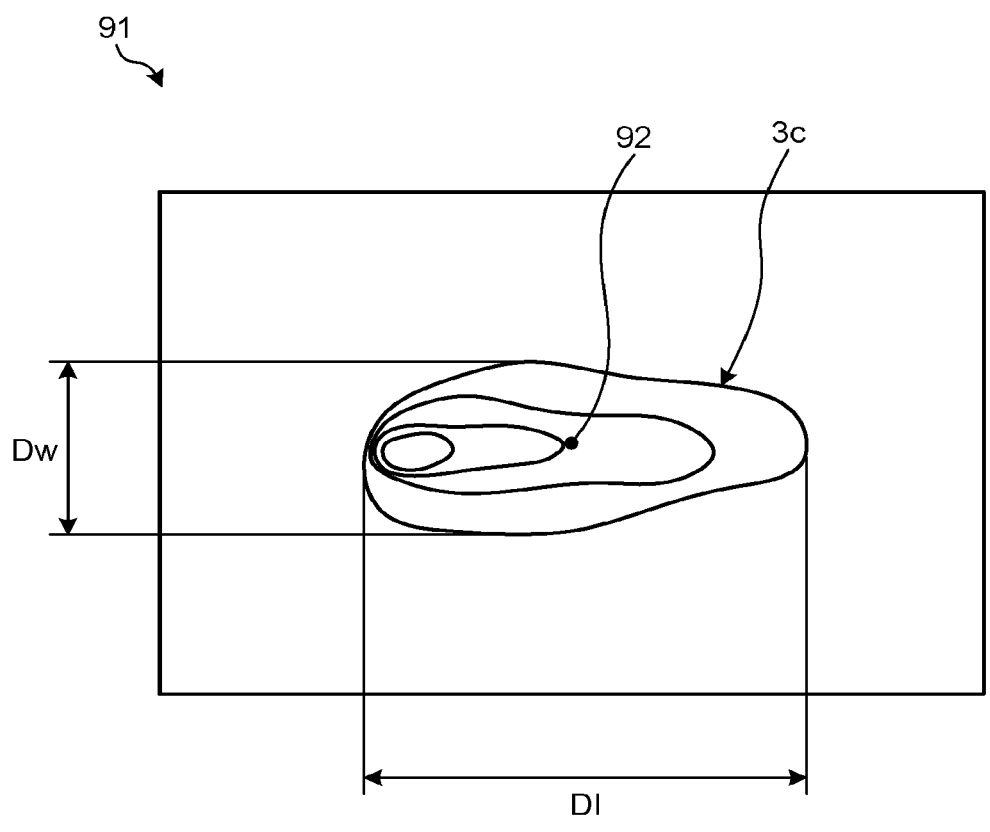
FIG. 11 is an exemplary view illustrating an example of a measurement result of a molten region according to the third embodiment.

FIG. 11 is an exemplary view illustrating an example of a measurement result of a molten region 3c according to the third embodiment. For example, the information generation unit 54 can obtain thermography 91 as illustrated in FIG. 11 by performing image processing on the measurement results (electric signal) of the shape and the temperature distribution of the molten region 3c measured by the measurement unit 12. The thermography 91 is the sample measurement information 65 indicating the measurement result of the layer 3a of the sample 3S or the measurement information 63 indicating the measurement result of the layer 3a of the shaped object 3.

As illustrated in FIG. 11, a representative point 92 is set in the thermography 91. The representative point 92 is set, for example, at the center of the thermography 91. Note that the representative point 92 may be set at another position in the thermography 91.

Information related to the coordinate of the representative point 92 is provided to the thermography 91. The coordinate of the representative point 92 is calculated on the basis of, for example, the measurement result of the distance meter 82, the distance between the distance meter 82 and the head 22, and the coordinate of the head 22 in the NC program 61. Furthermore, the thermography 91 is provided with information regarding a length Dl, a width Dw, and an area of the molten region 3c. The length Dl is a maximum length of the molten region 3c. The width Dw is a length of the molten region 3c in a direction orthogonal to the longitudinal direction of the molten region 3c.

Hereinafter, an example of a method for acquiring the sample measurement information 65, the internal defect information 66, and the defect characteristic information 67 and a method for generating the CNN 68 in the third embodiment will be described. Note that the sample measurement information 65, the internal defect information 66, the defect characteristic information 67, and the CNN 68 are not limited to the following examples.

Figure 12:
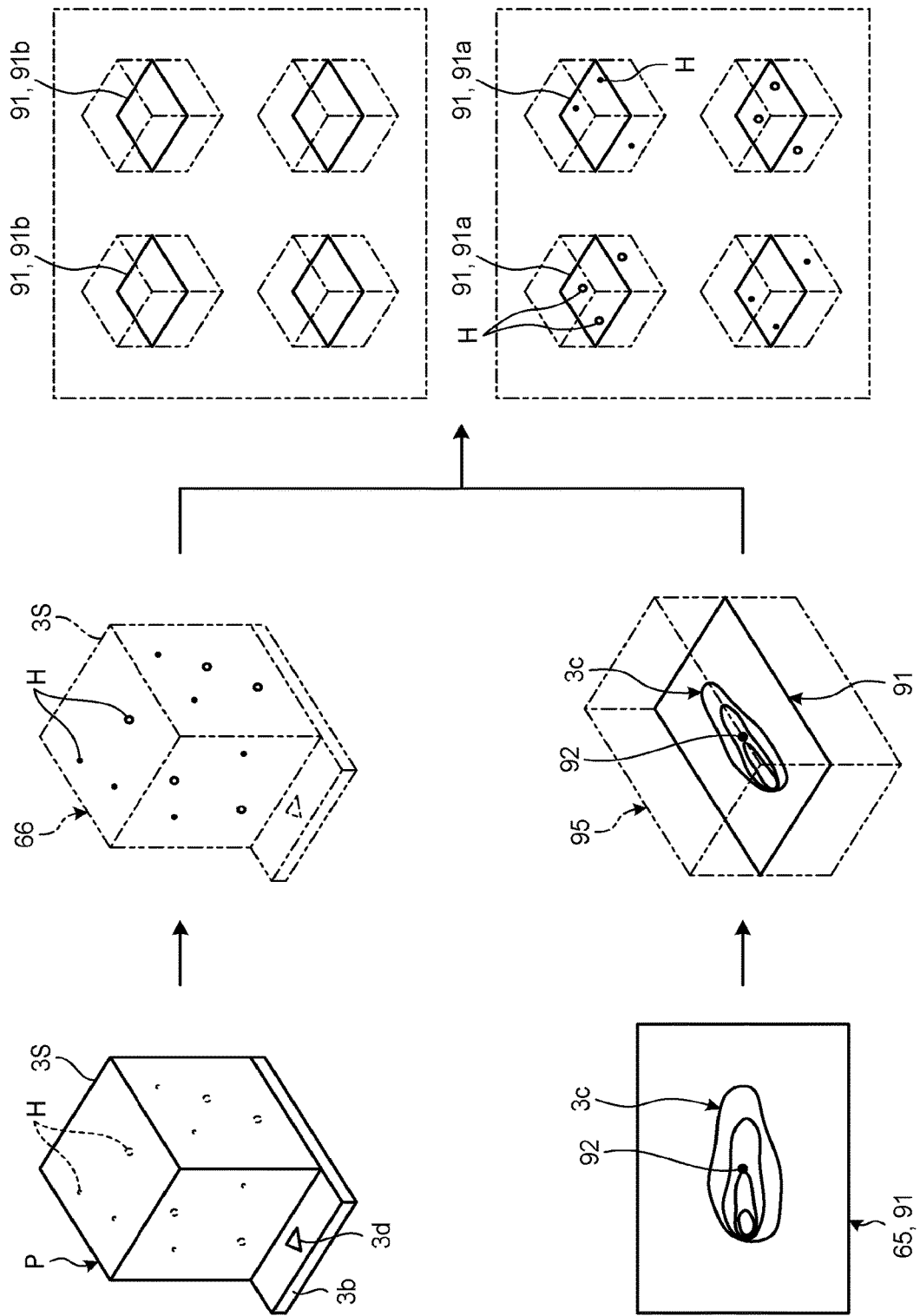
FIG. 12 is an exemplary diagram schematically illustrating procedure of creating a reference database according to the third embodiment.

FIG. 12 is an exemplary diagram schematically illustrating procedure of creating a reference database 62 according to the third embodiment. First, the shaping unit 11 additively manufactures a sample 3S. During shaping of the sample 3S, the measuring instrument 81 images the molten region 3c at a predetermined sampling rate (interval). For example, the measuring instrument 81 images the molten region 3c every time the head 22 moves about 1 mm with respect to the table 21. For example, the sampling rate is set such that a plurality of imaged regions do not overlap with each other.

The distance meter 82 measures the distance between the distance meter 82 and the molten region 3c on the basis of, for example, a trigger signal emitted every time the head 22 moves about 1 mm with respect to the table 21. This makes it possible to associate the thermography 91 of the molten region 3c with the coordinate of the representative point 92 of the thermography 91.

The information generation unit 54 generates the thermography 91 as the sample measurement information 65 from the measurement results of the measurement unit 12 acquired by the information acquisition unit 53. In other words, the sample measurement information 65 indicates the measurement result of the layer 3a (molten region 3c forming the layer 3a) of the sample 3S measured by the measurement unit 12. The information generation unit 54 provides information related to the coordinate of the representative point 92 of the thermography 91 to the thermography 91. The imaging of the molten region 3c is continued until the shaping of the sample 3S is completed.

When the sample 3S is shaped, the sample 3S is disposed in an X-ray shielding chamber and imaged by the CT scanner 45. The information acquisition unit 53 acquires the imaging result of the sample 3S by CT from the CT scanner 45. The information generation unit 54 generates internal defect information 66 on the basis of the imaging result of CT scanner 45 acquired by the information acquisition unit 53.

Next, the information generation unit 54 defines a small space 95 obtained by expanding the sample measurement information 65 by ±several tens μm to several hundreds μm in the height direction from the coordinate of the representative point 92. Note that the information generation unit 54 may extend or trim the sample measurement information 65 in the horizontal direction.

Next, for example, the information generation unit 54 extracts the defect H from the internal defect information 66 while regarding the defect H in the internal defect information 66 as a closed space. The information generation unit 54 superimposes the small space 95 and the internal defect information 66 from which the defect H is extracted. In a case where the small space 95 overlaps with the defect H in the internal defect information 66, the information generation unit 54 provides a label of "defective" to the thermography 91 corresponding to the small space 95. In a case where the small space 95 does not overlap with the defect H in the internal defect information 66, the information generation unit 54 provides a label of "non-defective" to the thermography 91 corresponding to the small space 95.

The small space 95 is superimposed on the internal defect information 66 on the basis of, for example, the alignment mark 3d. For example, the measurement unit 12 images the alignment mark 3d before measuring the molten region 3c. As a result, at least one of the sample measurement information 65 includes information related to the alignment mark 3d.

The information generation unit 54 superimposes the small space 95 on the internal defect information 66 such that the reference point of the sample measurement information 65 coincides with the reference point of the internal defect information 66. In other words, the internal defect information 66 and the sample measurement information 65 are associated with each other on the basis of the alignment mark 3d included in the internal defect information 66 and the alignment mark 3d included in the sample measurement information. Superimposition of the small space 95 and the internal defect information 66 is not limited to this example.

A plurality of pieces of thermography 91 includes a plurality of pieces of thermography 91a labeled "defective" and a plurality of pieces of thermography 91b labeled "non-defective". The plurality of pieces of thermography 91 provided with labels is used for machine learning as the so-called teacher data.

The information generation unit 54 generates defect characteristic information 67 about the thermography 91a to which the label "defective" is provided. The defect characteristic information 67 is, for example, information regarding a width, a length, a volume, a surface area, the number, and density of the defect H occurring inside the sample 3S at the position corresponding to the thermography 91b and is obtained from the internal defect information 66.

Next, the learning unit 55 performs machine learning on the basis of the plurality of pieces of thermography 91 and generates the CNN 68 as a learning result. For example, the CNN 68 calculates a feature amount of the thermography 91 related to occurrence of the defect H from the input thermography 91. The feature amount indicates whether or not a defect H occurs inside the sample 3S at a position corresponding to the representative point 92 of the thermography 91. Furthermore, in the present embodiment, the feature amount indicates information regarding a size of the defect H occurring inside the sample 3S at the position corresponding to the representative point 92.

Next, the information generation unit 54 associates the defect characteristic information 67 with the feature amount of the CNN 68. This enables the size of the defect H which will occur to be estimated on the basis of the feature amount calculated by the CNN 68. As described above, the reference database 62 for estimating occurrence of the defect H and the size of the defect H which will occur is generated on the basis of the sample measurement information 65, the internal defect information 66, and the defect characteristic information 67 and stored in the storage unit 51.

The reference database 62 is not limited to the CNN 68 and may have other process windows. The process window indicates, for example, correspondence relationship in which the defect H occurs in the shaped object 3 in a case where the width Dw of the molten region 3c falls below a predetermined value, and correspondence relationship of the size of the defect H with respect to a value of the width Dw.

Figure 13:
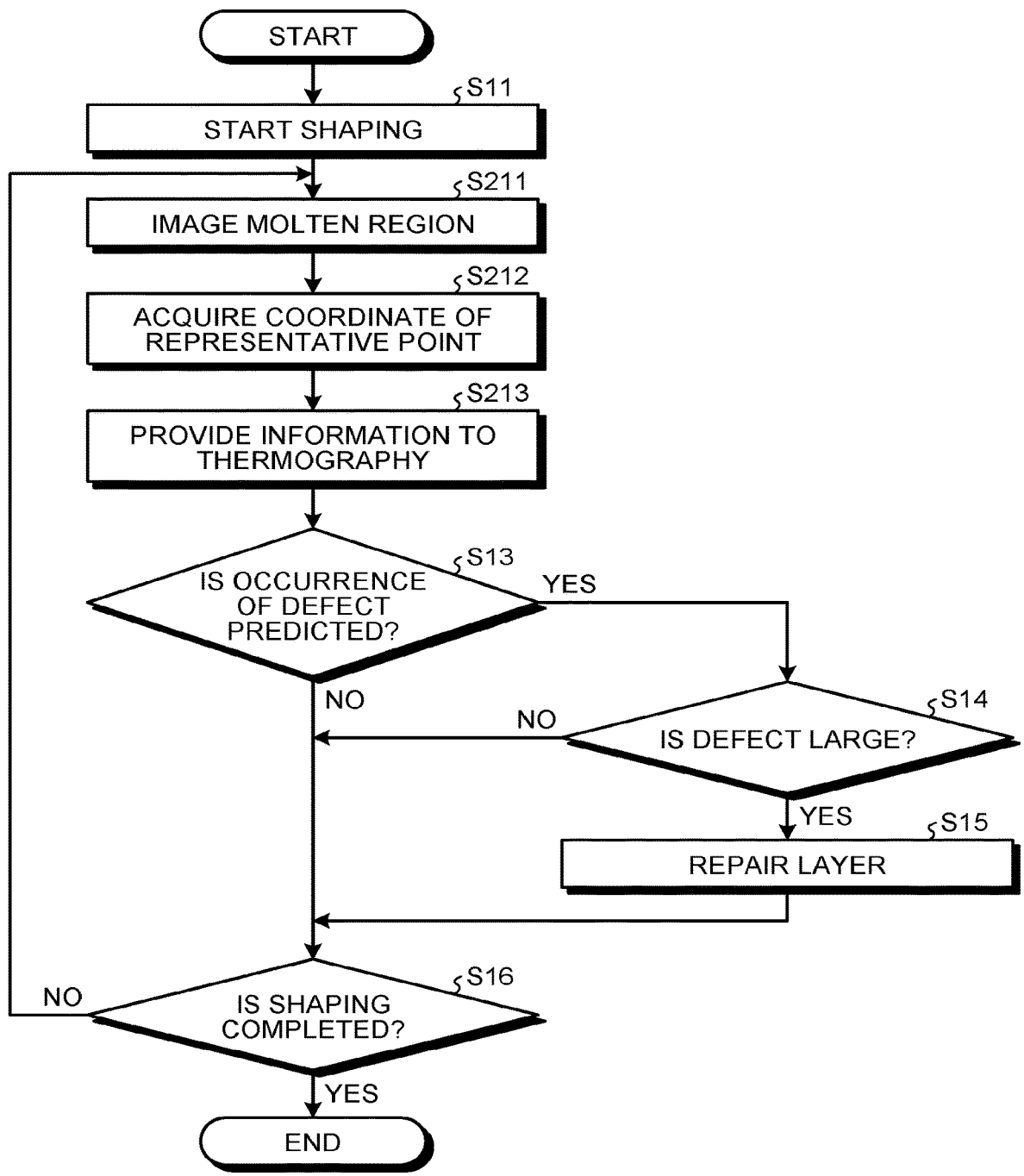
FIG. 13 is an exemplary flowchart illustrating an example of an additive manufacturing method according to the third embodiment.

FIG. 13 is an exemplary flowchart illustrating an example of an additive manufacturing method according to the third embodiment. Additive manufacturing by the additive manufacturing system 1 according to the third embodiment will be described below with reference to FIG. 13. As illustrated in FIG. 13, first, the shaping unit 11 starts additive manufacturing on the basis of the NC program 61 (S11).

Next, the measuring instrument 81 of the measurement unit 12 images the molten region 3c (S211). Further, the distance meter 82 of the measurement unit 12 measures the distance between the distance meter 82 and the molten region 3c, and the information generation unit 54 acquires the coordinate of the representative point 92 on the basis of the measurement result (S212). For example, every time the head 22 moves by a predetermined distance with respect to the table 21, the measurement unit 12 executes imaging and measurement in S211 and S212.

Next, the information generation unit 54 provides coordinate information on the representative point 92 to the imaged thermography 91 (S213). For example, the information generation unit 54 may provide other information such as a maximum temperature in the thermography 91 to the thermography 91.

Next, the occurrence prediction unit 56a of the estimation unit 56 predicts whether or not the defect H will occur inside the shaped object 3 (S13). The occurrence prediction unit 56a calculates a feature amount on the basis of the measurement information 63 and the CNN 68. The occurrence prediction unit 56a predicts whether or not the defect H will occur inside the shaped object 3 from the calculated feature amount.

In a case where it is predicted that the defect H will occur inside the shaped object 3 (S13: Yes), the feature prediction unit 56b predicts whether or not a size of the defect H is larger than a predetermined size (S14). In a case where the size of the defect H is predicted to be larger than the predetermined size (S14: Yes), the shaping control unit 52 controls the repair device 71 to repair the layer 3a (S15).

In repairing in the third embodiment, for example, the head 22 is disposed above a position where the defect H is estimated to occur. The distance between the distal end 22a of the head 22 and the surface of the layer 3a is set to be substantially equal to, for example, a convergence distance of the material M discharged from the head 22. The head 22 irradiates the position with the energy ray E and supplies minimum necessary heat to the layer 3a to remelt the layer 3a. As a result, the surface of the layer 3a is leveled, and the layer 3a is repaired. The repairing may be performed by the repair device 71 as in the first embodiment.

In the first embodiment and the third embodiment, repairing may be performed as follows. For example, in a case where the size of the defect H is larger than the predetermined size and the number of defects H is small, the repair device 71 scrapes the layer 3a around the position where the defect H is predicted to occur. In a case where the size of the defect H is larger than the predetermined size and the number of the defects H is large, the repair device 71 scrapes the entire region of the layer 3a where the defect H is predicted to occur. In a case where the size of the defect H is smaller than the predetermined size, the layer 3a around the position where the defect H is predicted to occur is repaired by the energy ray E. In a case where the size of the defect H is smaller than the predetermined size and the number of defects H is small, additive manufacturing is continued without repairing being performed. In a case where the small defects H are stacked over a predetermined number of layers 3a, the repair device 71 scrapes the plurality of layers 3a.

When the layer 3a is repaired, the shaping control unit 52 determines whether or not the additive manufacturing is completed (S16). In a case where the additive manufacturing is not completed (S16: No), the processing returns to S211, and the measurement unit 12 measures the molten region 3c again.

In a case where the defect H is not predicted to occur in S13 (S13: No), and in a case where the size of the defect H is predicted to be smaller than the predetermined size in S14 (S14: No), the shaping control unit 52 determines whether or not the additive manufacturing is completed (S16). In a case where the additive manufacturing is completed in S16 (S16: Yes), the additive manufacturing in the additive manufacturing system 1 ends.

In the additive manufacturing system 1 of the third embodiment described above, the measurement unit 12 measures a state of the material M (molten region 3c) melted by the shaping unit 11. The estimation unit 56 estimates whether or not the defect H will occur inside the shaped object 3 on the basis of the measurement information 63 indicating the measurement result on the molten region 3c forming the layer 3a of the shaped object 3 and the sample measurement information 65 and the internal defect information 66 on the molten region 3c forming the layer 3a of the sample 3S. As described in "Satoshi Asai: 'Toward the Realization of Advanced Smart Welding Systems', Osaka University Industrial Journal (572), 17-21, 2016-04", the state of the molten region 3c forming the layer 3a affects occurrence of the defect H inside the shaped object 3. Thus, whether or not the defect H will occur inside the shaped object 3 can be estimated by using the measurement result of the molten region 3c forming the layer 3a.

Fourth Embodiment

Figure 14:
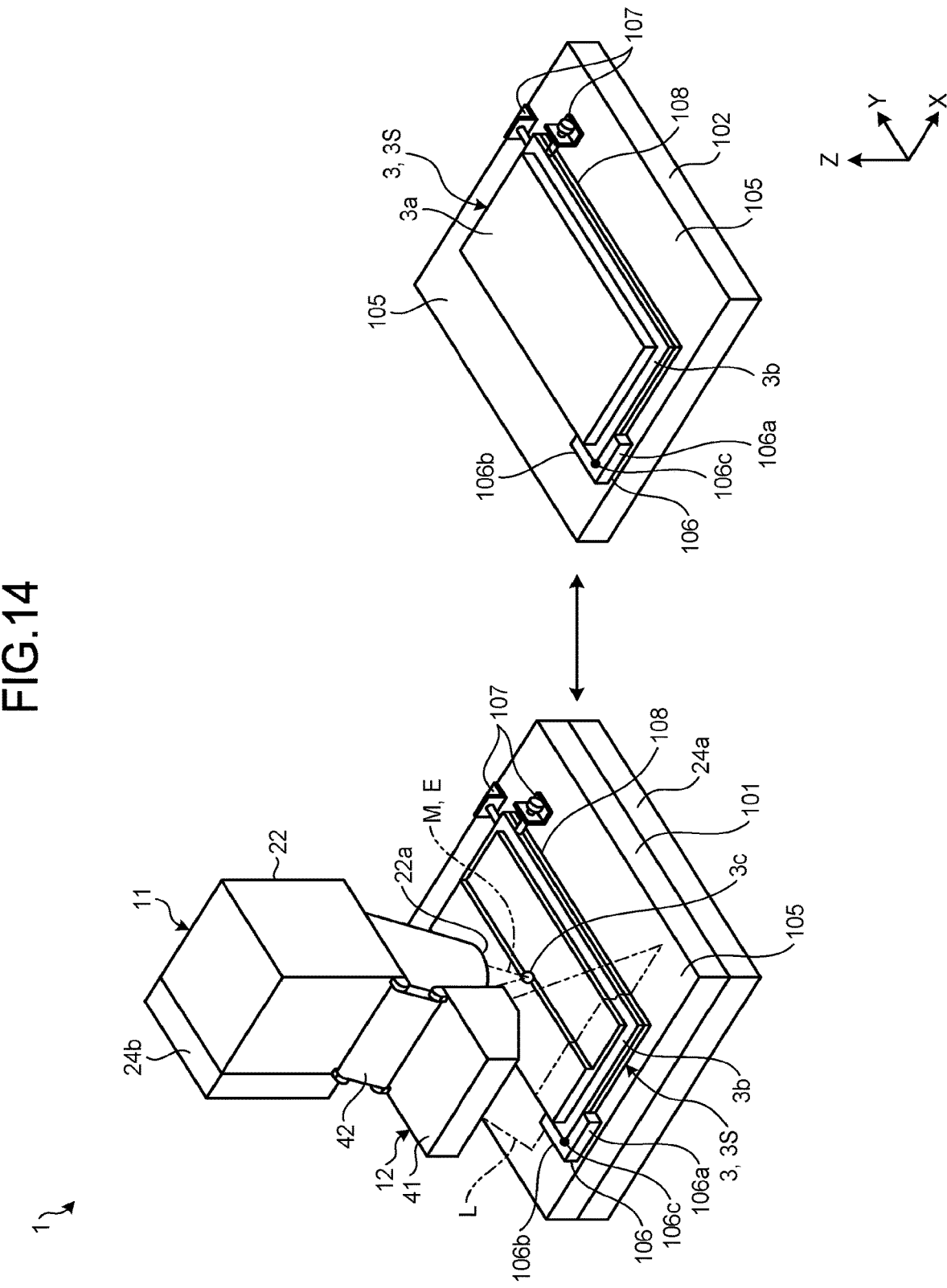
FIG. 14 is an exemplary perspective view schematically illustrating an additive manufacturing system according to a fourth embodiment.

A fourth embodiment will be described below with reference to FIG. 14. FIG. 14 is an exemplary perspective view schematically illustrating an additive manufacturing system 1 according to the fourth embodiment. As illustrated in FIG. 14, in the fourth embodiment, the shaping unit 11 includes a first table 101 and a second table 102 instead of the table 21. The first table 101 and the second table 102 are disposed at different positions.

Each of the first table 101 and the second table 102 includes a support surface 105, a jig 106, and a plurality of fixing screws 107. The support surface 105 is formed to be substantially flat and faces the +Z direction. The jig 106 and the fixing screws 107 are disposed on the support surface 105.

The jig 106 has a first extending portion 106a extending in the X direction and a second extending portion 106b extending in the Y direction. The first extending portion 106a and the second extending portion 106b can align the base 3b in the X direction and the Y direction by being abut on the base 3b of the shaped object 3.

The fixing screw 107 presses the base 3b against the jig 106 in the X direction and the Y direction. Thus, the base 3b is fixed on the support surface 105. In order to align the fixing screw 107 and the base 3b in the Z direction, a spacer 108 may be disposed between the support surface 105 and the base 3b.

In the X direction and the Y direction, a reference point (origin) of the coordinate in the NC program 61, the measurement information 63, the sample measurement information 65, the internal defect information 66, and the defect characteristic information 67 is set at a corner 106c between the first extending portion 106a and the second extending portion 106b. The reference point of the coordinate in the Z direction may be set on the support surface 105 or may be set on a surface of the base 3b.

The shaping unit 11 stacks the layer 3a of the material M on the base 3b disposed on the support surface 105 of the first table 101 to shape the shaped object 3. The CT scanner 45 images the shaped object 3 disposed on the support surface 105 of the second table 102. The repair device 71 may repair the layer 3a of the shaped object 3 disposed on the support surface 105 of the second table 102. The NC program 61, the measurement information 63, the sample measurement information 65, the internal defect information 66, the defect characteristic information 67, and the repair device 71 are aligned on the basis of the reference point set at the corner 106c of the jig 106.

In the additive manufacturing system 1 of the fourth embodiment described above, the NC program 61, the measurement information 63, the sample measurement information 65, the internal defect information 66, and the repair device 71 are aligned on the basis of the reference point set at the corner 106c of the jig 106. This eliminates the necessity of providing the alignment mark 3d on the base 3b, so that it is possible to make the base 3b smaller.

The NC program 61, the measurement information 63, the sample measurement information 65, the internal defect information 66, and the repair device 71 may be aligned using other methods. For example, a plurality of positions is measured by a touch sensor at edges of the base 3b in the X direction and the Y direction. From the measurement result, expressions of two straight lines indicating the edges of the base 3b in the X direction and the Y direction are obtained. A reference point can be set at an intersection of the two straight lines. On the basis of the two straight lines, it is also possible to calculate an inclination between the coordinate in the NC program 61, the measurement information 63, the sample measurement information 65, the internal defect information 66 and the repair device 71, and the base 3b.

In the above embodiment, the additive manufacturing system 1 includes the inspection unit 13 and acquires the internal defect information 66. However, the additive manufacturing system 1 only requires to include the reference database 62 based on the sample measurement information 65 and the internal defect information 66, and does not have to include the inspection unit 13 and the internal defect information 66. For example, the internal defect information 66 may be obtained by a CT scanner as a device different from the additive manufacturing system 1 that performs additive manufacturing of the shaped object 3. In this case, for example, the internal defect information 66 is input to the additive manufacturing system 1 via an electric communication line or an information recording medium.

Figure 15:
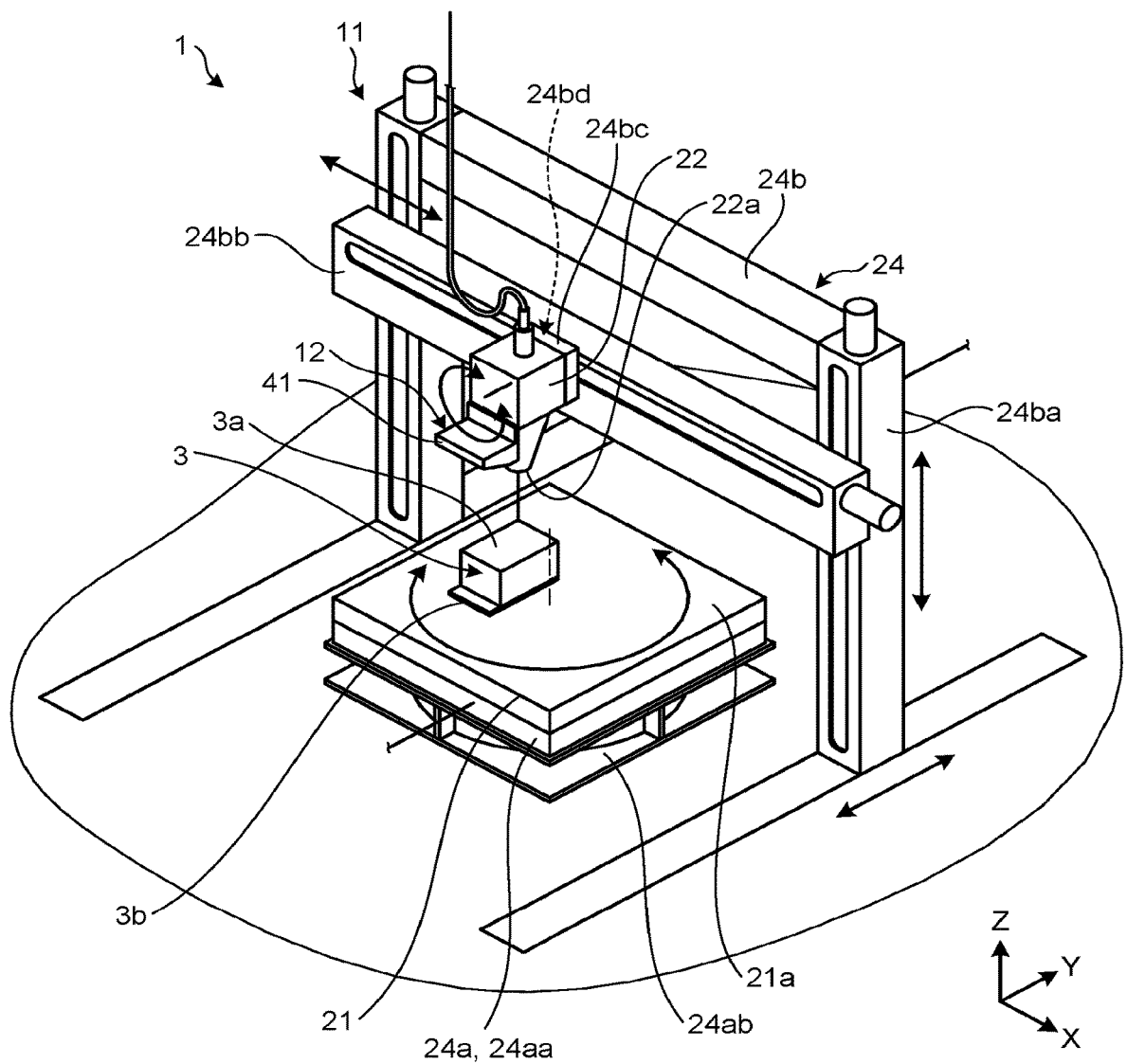
FIG. 15 is an exemplary perspective view illustrating an example of an additive manufacturing system according to each embodiment.

FIG. 15 is an exemplary perspective view illustrating an example of an additive manufacturing system 1 according to each embodiment. The additive manufacturing system 1 of the above embodiment is applied to, for example, the additive manufacturing system 1 as illustrated in FIG. 15. Note that the additive manufacturing system 1 is not limited to the example of FIG. 15.

In the example of FIG. 15, the first moving device 24a includes, for example, a parallel moving device 24aa and a rotation device 24ab. The parallel moving device 24aa moves the table 21 in the X direction and the Y direction. The rotation device 24ab rotates the table 21 about a rotation axis extending in the Z direction.

The second moving device 24b includes a first moving unit 24ba, a second moving unit 24bb, a third moving unit 24bc, and a rotation unit 24bd. The first moving unit 24ba is formed in a substantially gate shape and moves in the Y direction. The second moving unit 24bb is formed in a beam shape and is attached to a column of the first moving unit 24ba extending in the Z direction. The second moving unit 24bb moves in the Z direction. The third moving unit 24bc is attached to the second moving unit 24bb extending in the X direction. The third moving unit 24bc moves in the X direction. The rotation unit 24bd is provided in the third moving unit 24bc and rotates the head 22 about a rotation axis extending in the Y direction. The first moving unit 24ba and the third moving unit 24bc of the second moving device 24b can move the head 22 in the X direction and the Y direction with respect to the table 21. For this reason, the parallel moving device 24aa of the first moving device 24a may be omitted.

In the example of FIG. 15, the measuring instrument 41 of the first embodiment is attached to the head 22. However, the additive manufacturing system 1 in FIG. 15 may include the measuring instrument 81 and the distance meter 82 in the third embodiment. In the example of FIG. 15, the table 21 may include the support surface 105, the jig 106, and the plurality of fixing screws 107 in the fourth embodiment.

In the above embodiment, the additive manufacturing system 1 includes the control unit 14 electrically connected to the shaping unit 11, the measurement unit 12, and the inspection unit 13 via a signal line. However, as specifically exemplified below, the control unit 14 may include a computer which is provided separately from the shaping unit 11 and which can communicate with the shaping unit 11 via a network.

Figure 16:
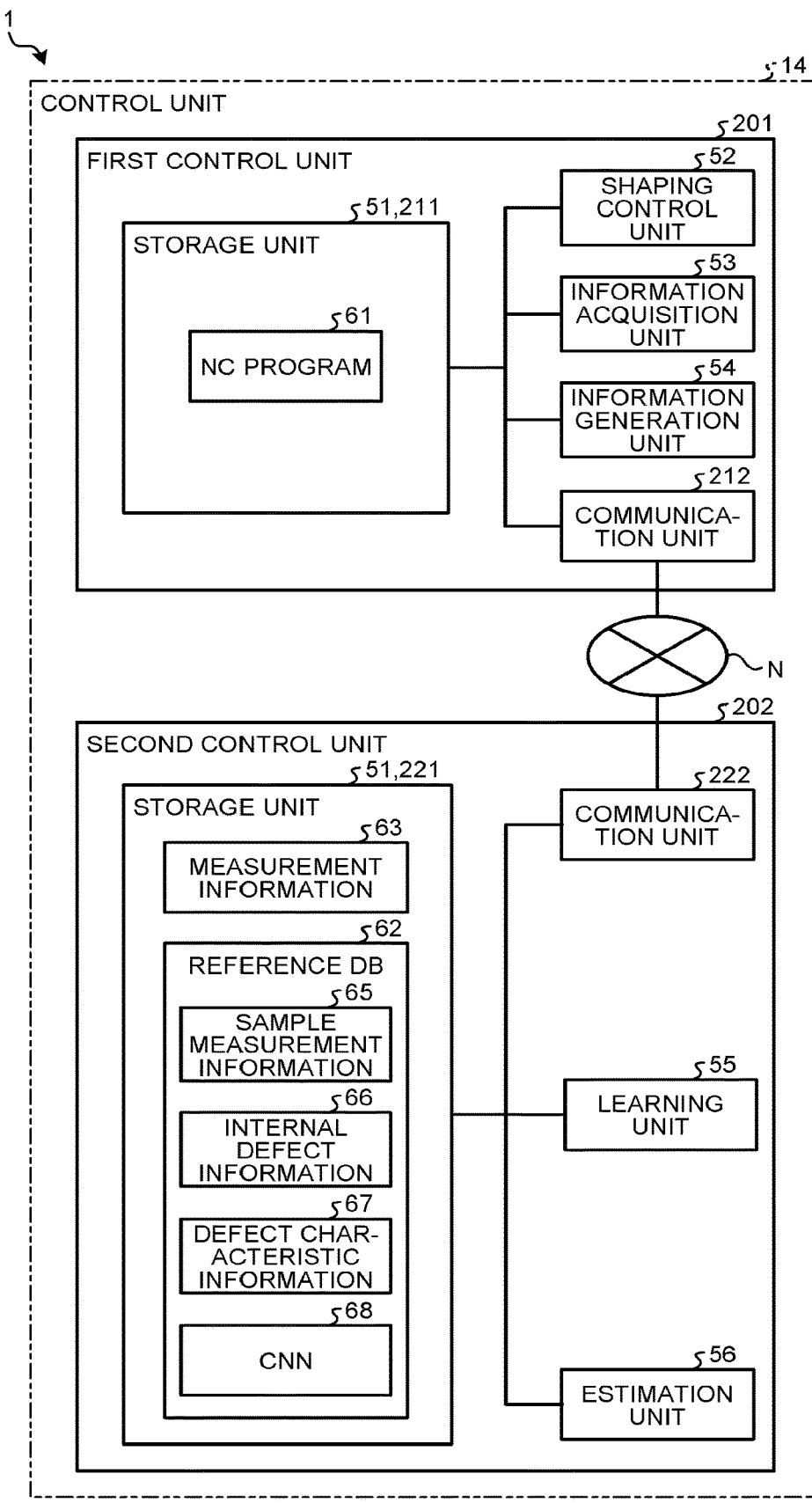
FIG. 16 is an exemplary block diagram functionally illustrating a configuration of an additive manufacturing system according to a modification of each embodiment.

FIG. 16 is an exemplary block diagram functionally illustrating a configuration of an additive manufacturing system 1 according to a modification of each embodiment. As illustrated in FIG. 16, the control unit 14 may include a first control unit 201 and a second control unit 202. The first control unit 201 is electrically connected to the shaping unit 11, the measurement unit 12, and the inspection unit 13 via a signal line. On the other hand, the second control unit 202 is provided separately from the shaping unit 11, the measurement unit 12, the inspection unit 13, and the first control unit 201, and is provided to be able to communicate with the first control unit 201 via the network N.

In the example of FIG. 16, the first control unit 201 and the second control unit 202 include functions of the control unit 14 in the first to fourth embodiments in a divided manner. For example, the first control unit 201 includes the shaping control unit 52, the information acquisition unit 53, the information generation unit 54, a storage unit 211, and a communication unit 212. On the other hand, the second control unit 202 includes the learning unit 55, the estimation unit 56, a storage unit 221, and a communication unit 222. The storage units 211 and 221 include functions of the storage unit 51 according to the first to fourth embodiments in a divided manner.

The first control unit 201 controls additive manufacturing and measurement in the additive manufacturing system 1. The storage unit 211 of the first control unit 201 stores the NC program 61. On the basis of the NC program 61 in the storage unit 211, the shaping control unit 52 controls the shaping unit 11 to perform additive manufacturing as in the first to fourth embodiments. The information acquisition unit 53 acquires the measurement results from the measurement unit 12. The information generation unit 54 generates the measurement information 63 from the measurement results of the measurement unit 12 acquired by the information acquisition unit 53. The information generation unit 54 stores the measurement information 63 in the storage unit 221 of the second control unit 202 through the communication units 212 and 222. Note that the information generation unit 54 may store the measurement information 63 in the storage unit 211.

The communication unit 212 of the first control unit 201 and the communication unit 222 of the second control unit 202 transmit and receive information to and from each other via the network N. This enables the first control unit 201 and the second control unit 202 to read and write information from and to the storage units 211 and 221. Furthermore, the first control unit 201 and the second control unit 202 can send commands to each other. The communication units 212 and 222 may perform communication in a wired manner or in a wireless manner.

The second control unit 202 controls machine learning and estimation in the additive manufacturing system 1. The storage unit 221 of the second control unit 202 stores the reference database 62 and the measurement information 63. The learning unit 55 acquires the image 69 and performs machine learning as in the first to fourth embodiments. As in the first to fourth embodiments, the estimation unit 56 estimates (predicts) whether or not a defect will occur inside the shaped object 3 on the basis of the measurement information 63 and the reference database 62.

As described above, the first control unit 201 and the second control unit 202 may include the functions of the control unit 14 in the first to fourth embodiments in a divided manner. The first control unit 201 and the second control unit 202 are not limited to the example of FIG. 16. For example, the first control unit 201 may include the estimation unit 56, and both the storage units 211 and 221 may store the reference database 62 and the measurement information 63, so that machine learning may be performed via the network N and estimation may be performed locally. Furthermore, the additive manufacturing system 1 may include a plurality of first control units 201 and one second control unit 202 which can perform communication with the plurality of first control units 201.

Figure 17:
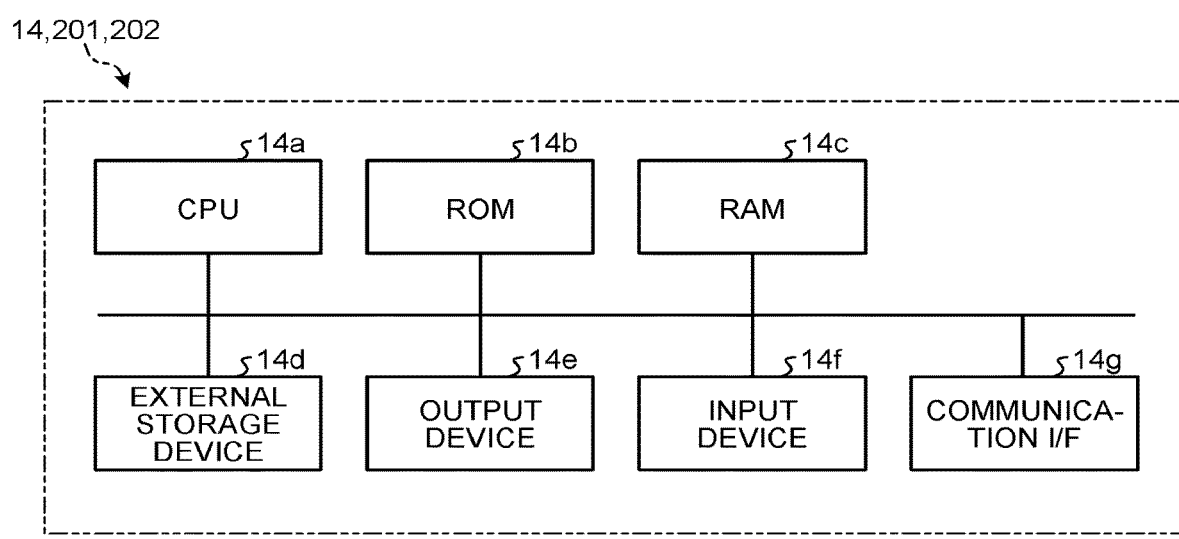
FIG. 17 is an exemplary block diagram illustrating a hardware configuration of a control unit according to the modification of each embodiment.

FIG. 17 is an exemplary block diagram illustrating a hardware configuration of the control unit 14 according to the modification of each embodiment. In the above-described modification, as in the first to fourth embodiments, each of the first control unit 201 and the second control unit 202 includes the control device such as the CPU 14a, the ROM 14b, the RAM 14c, the external storage device 14d, the output device 14e, and the input device 14f, and has a hardware configuration using a normal computer. In addition, each of the first control unit 201 and the second control unit 202 includes the communication interface (I/F) 14g for performing communication via the network N.

By the CPU 14a executing a program incorporated in the ROM 14b or the external storage device 14d, the control unit 14 controls each unit of the additive manufacturing system 1. For example, the CPU 14a of the first control unit 201 functions as the shaping control unit 52, the information acquisition unit 53, the information generation unit 54, and the communication unit 212. In addition, the CPU 14a of the second control unit 202 functions as the learning unit 55, the estimation unit 56, and the communication unit 212. In addition, the RAM 14c and the external storage device 14d function as the storage unit 51.

The above-described embodiments of the present invention do not limit the scope of the invention and are merely examples included in the scope of the invention. In an embodiment of the present invention, for example, at least part of specific applications, structures, shapes, operation, and effects may be changed, omitted, or added to the above-described embodiment without departing from the gist of the invention.

The invention claimed is:

1. An additive manufacturing system, comprising:
an additive manufacturing unit configured to
shape a target object including a plurality of target object layers by forming the plurality of target object layers,
shape a sample object including a plurality of sample object layers so that internal defect information and sample measurement information are measured and stored to shape the target object, and
radiate an electromagnetic wave;
a measuring instrument configured to measure a shape of a surfaces of each of the plurality of target object layers and the plurality of sample object layers;
an inspection device configured to measure an internal shape of a sample object on a basis of the electromagnetic wave which has passed through the sample object; and a controller, wherein the target object is any of a maximum size measurable by the inspection device, smaller than the maximum measurable size, or bigger than the maximum measurable size, the sample object is the maximum measurable size or smaller, the controller includes a processor and a storage device, the processor is configured to perform machine learning based on the internal defect information and the sample measurement information to generate a learning result, the internal defect information indicates a defect existing inside the sample object based on the electromagnetic wave which has passed through the sample object, the sample measurement information indicates a measurement result of the shapes of the plurality of sample object layers measured by the measuring instrument, the storage device is configured to store the learning result, the processor is configured to;
  estimate whether or not a defect occurs inside the target object, based on measurement information indicating a measurement result of the shapes of the plurality of target object layers measured by the measuring instrument and the learning result,
  estimate a size of the defect,
  based upon the estimation of the occurrence and size of the defect, determine whether to repair the target object or continue shaping the target object, and
  control the additive manufacturing unit to repair the target object or continue shaping the target object.

2. The additive manufacturing system according to claim 1, wherein the internal defect information is based on an imaging result of the sample object by computed tomography.

3. The additive manufacturing system according to claim 1, wherein the measuring instrument includes a non-contact three-dimensional measuring instrument.

4. The additive manufacturing system according to claim 3, wherein
the additive manufacturing unit comprises:
  a head configured to form the plurality of target object layers and the plurality of sample object layers by discharging a material and melting or sintering the material;
  an object support unit configured to support the target object and the sample object; and
  a moving unit configured to move the head relative to the object support unit, and
the measuring instrument is connected to the head and is moved relative to the object support unit by the moving unit together with the head.

5. The additive manufacturing system according to claim 1, wherein the measuring instrument is configured to measure a surface roughness of each of the plurality of target object layers and the plurality of sample object layers.

6. The additive manufacturing system according to claim 5, wherein the measuring instrument includes a non-contact three-dimensional measuring instrument.

7. The additive manufacturing system according to claim 1, wherein
the additive manufacturing unit is configured to form the plurality of target object layers and the plurality of sample object layers by melting a material, and
the measuring instrument is configured to measure a state of the material melted by the additive manufacturing unit.

8. The additive manufacturing system according to claim 7, wherein the measuring instrument is configured to measure a temperature distribution of the material melted by the additive manufacturing unit.

9. The additive manufacturing system according to claim 1, wherein the additive manufacturing unit comprises a repair device configured to repair one of the plurality of target object layers, based on an estimation result of the processor.

10. The additive manufacturing system according to claim 9, wherein
reference information is based on the internal defect information, the sample measurement information, and defect characteristic information regarding a size of the defect inside the sample object,
the processor is configured to estimate whether or not a first defect or a second defect occurs inside the object, based on the measurement information and the reference information, and
the additive manufacturing unit is configured to
  repair the one layer by the repair unit in a case where the processor estimates that the first defect occurs inside the target object, and
  continue shaping of the target object in a case where the processor estimates that the second defect occurs inside the target object.

11. The additive manufacturing system according to claim 1, wherein
the additive manufacturing unit is configured to shape an alignment mark on the sample object,
each of the internal defect information and the sample measurement information includes information related to the alignment mark, and
the internal defect information and the sample measurement information are associated with each other based upon the alignment mark.

* * * * *